US009338631B2

(12) United States Patent
Anulf et al.

(10) Patent No.: US 9,338,631 B2
(45) Date of Patent: May 10, 2016

(54) METHOD AND APPARATUS FOR ONLINE CHARGING IN AN IP MULTIMEDIA SUBSYSTEM

(75) Inventors: Andreas Anulf, Lidingö (SE); Ove Karlsson, Emmaboda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 268 days.

(21) Appl. No.: 13/982,369

(22) PCT Filed: Dec. 22, 2011

(86) PCT No.: PCT/EP2011/073886
§ 371 (c)(1),
(2), (4) Date: Aug. 14, 2013

(87) PCT Pub. No.: WO2012/103989
PCT Pub. Date: Aug. 9, 2012

(65) Prior Publication Data
US 2013/0315106 A1   Nov. 28, 2013

Related U.S. Application Data

(60) Provisional application No. 61/437,965, filed on Jan. 31, 2011, provisional application No. 61/437,833, filed on Jan. 31, 2011.

(51) Int. Cl.
*H04Q 11/00* (2006.01)
*H04W 4/24* (2009.01)
(Continued)

(52) U.S. Cl.
CPC ............. *H04W 4/24* (2013.01); *H04L 12/1467* (2013.01); *H04M 15/64* (2013.01)

(58) Field of Classification Search
CPC . H04L 12/1403; H04L 12/141; H04L 12/142; H04L 12/1446; H04L 12/1417; H04L 12/1407; H04M 15/64; H04M 15/06; H04M 15/66; H04M 17/20; H04M 17/201; H04W 4/24
See application file for complete search history.

(56) References Cited
U.S. PATENT DOCUMENTS
6,700,961 B1    3/2004  Dacloush et al.
8,175,575 B2 *  5/2012  Cai et al. .................. 455/406
(Continued)

OTHER PUBLICATIONS
3rd Generation Partnership Project. 3GPP TS 24.229 V. 10.2.0 (Dec. 2010). 3rd Generation Partnership Project; Technical Specification Group Core Network and Terminals; IP Multimedia Call Control Protocol Based on Initiation Protocol (SIP) and Session Description Protocol (SDP); Stage 3 (Release 10). Dec. 2010, pp. 1-353.
(Continued)

*Primary Examiner* — Brian O'Connor
(74) *Attorney, Agent, or Firm* — Murphy, Bilak & Homiller, PLLC

(57) ABSTRACT

A method is provided for online charging within an IP Multimedia Subsystem, IMS. A first credit control request message is received (S-A) at an IMS charging node (30) from an IMS service network node (20) over a service charging interface (22) provided between the IMS service node (20) and the IMS charging node (30). In response to receipt of the first credit control message, it is determined (S-B) at the IMS charging node (30), with reference to one or more triggering conditions, that a replenishment of credit is to be offered for a user associated with the first credit control request message. Following such a determination, a credit replenishment service is initiated in the IMS service node (20) by sending (S-D) a replenishment request in a first credit control answer message over the service charging interface (22) from the IMS charging node (30) to the IMS service node (20), the first credit control answer message being in response to the first credit control request message. Alternatively, a credit replenishment service is initiated (S-E) in the IMS charging node (30). In this alternative, a second credit control request message associated with the user is received (S-F) from a transport network node (40) over a bearer charging interface (42) provided between the transport node (40) and the IMS charging node (30); and, in response to receipt of the second credit control request message and as part of the replenishment service, a replenishment request is sent (S-G) in a second credit control answer message over the bearer charging interface (42) to the transport node (40), the second credit control answer message being in response to the second credit control request message.

20 Claims, 23 Drawing Sheets

(51) Int. Cl.
H04L 12/14 (2006.01)
H04M 15/00 (2006.01)

(56) References Cited

U.S. PATENT DOCUMENTS

| | | | |
|---|---|---|---|
| 8,423,468 B2* | 4/2013 | Karlsson | 705/44 |
| 8,488,597 B2* | 7/2013 | Nie et al. | 370/353 |
| 8,831,014 B2* | 9/2014 | Koodli et al. | 370/401 |
| 8,942,668 B2* | 1/2015 | Cai et al. | 455/406 |
| 2007/0041536 A1* | 2/2007 | Koskinen et al. | 379/114.28 |
| 2009/0088129 A1* | 4/2009 | Cai et al. | 455/406 |
| 2010/0184403 A1* | 7/2010 | Cai et al. | 455/406 |
| 2012/0099715 A1* | 4/2012 | Ravishankar et al. | 379/114.01 |
| 2012/0157041 A1* | 6/2012 | Cai et al. | 455/406 |
| 2012/0163297 A1* | 6/2012 | Agarwal et al. | 370/328 |
| 2013/0017803 A1* | 1/2013 | Li et al. | 455/406 |
| 2013/0157615 A1* | 6/2013 | Gonzalez et al. | 455/406 |
| 2013/0226790 A1* | 8/2013 | Xu | 705/39 |

OTHER PUBLICATIONS

3rd Generation Partnership Project. 3GPP TS 32.240 V. 10.0.0 (Dec. 2010). 3rd Generation Partnership Project; Technical Specification Group Services and System Aspects; Telecommunication management; Charging management; Charging architecture and principles (Release 10). Dec. 2010, pp. 1-43.

3rd Generation Partnership Project. 3GPP TS 32.260 V. 10.2.0 (Dec. 2010). 3rd Generation Partnership Project; Technical Specification Group Services and System Aspects; Telecommunication management; Charging management; IP Multimedia Subsystem (IMS) charging (Release 10). Dec. 2010. pp. 1-122.

3rd Generation Partnership Project. 3GPP TS 32.299 V. 10.0.0 (Dec. 2010). 3rd Generation Partnership Project;Technical Specification Group Services and System Aspects; Telecommunication management; Charging management; Diameter charging applications (Release 10). Dec. 2010. pp. 1-146.

Lior, A. et al. "Prepaid Extensions to Remote Authentication Dial-In User Service (RADIUS)." The Internet Society. Oct. 25, 2010, pp. 1-94.

Kurtanksky, P at el. "State of the Art Prepaid Charging for IP Services." WWIC'06 Proceedings of the 4th international conference on Wired/Wireless Internet Communications. 2006, pp. 143-154. Springer-Verlag Berlin, Heidelberg.

3rd Generation Partnership Project. "3GPP TS 32.275 V9.5.0." 3rd Generation Partnership Project; Technical Specification Group Services and System Aspects; Telecommunication management; Charging management; MultiMedia Telephony (MMTel) charging (Release 9). Dec. 20120, pp. 1-92.

Hakala, H. et al. Diameter Credit-Control Application. Internet Engineering Task Force, Network Working Group, RFC 4006, Standards Track, Aug. 2005, pp. 1-102.

Calhoun, P. et al. "Diameter Base Protocol." Internet Engineering Task Force, Network Working Group, RFC3588, Standards Track, Sep. 2003, pp. 1-148.

* cited by examiner

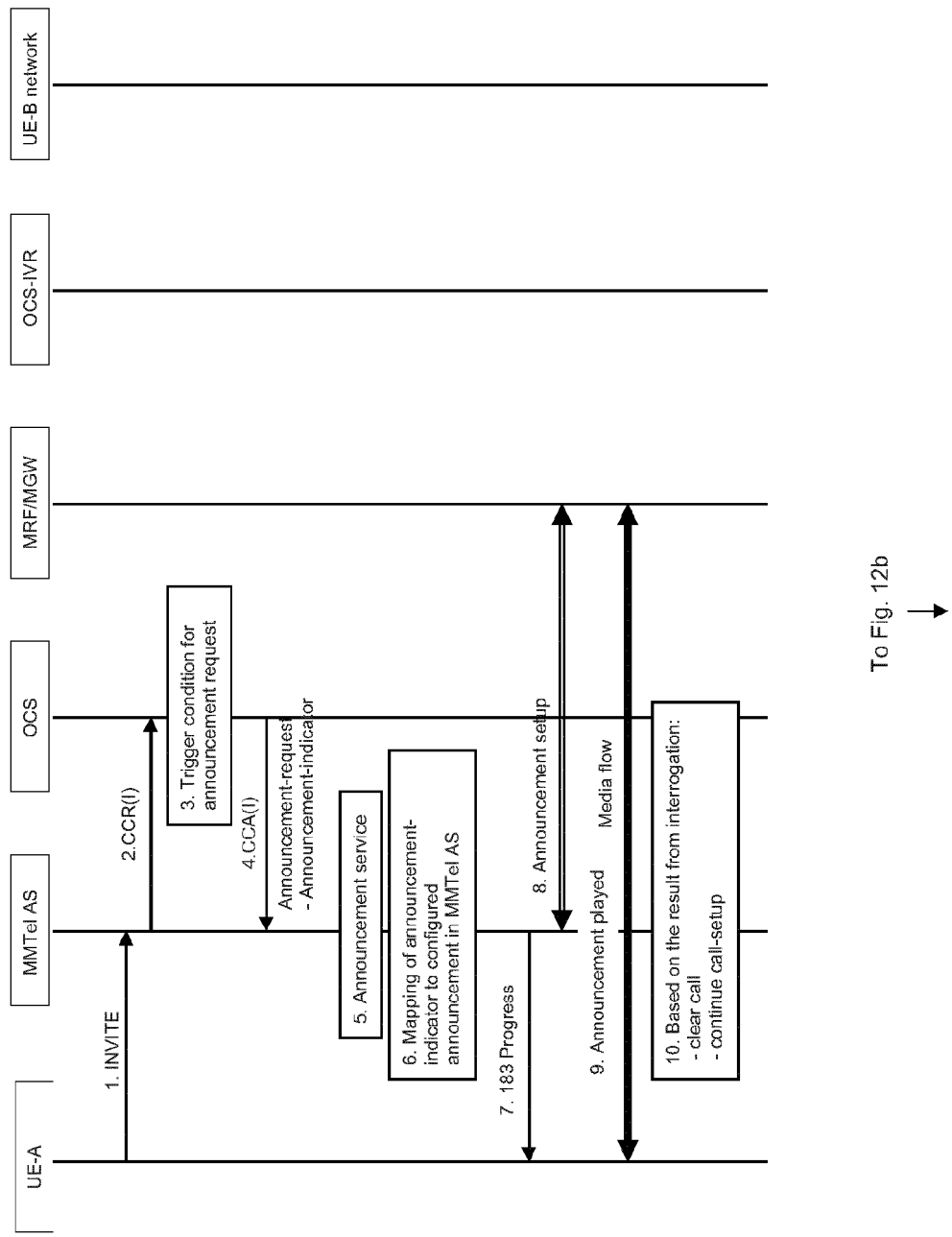

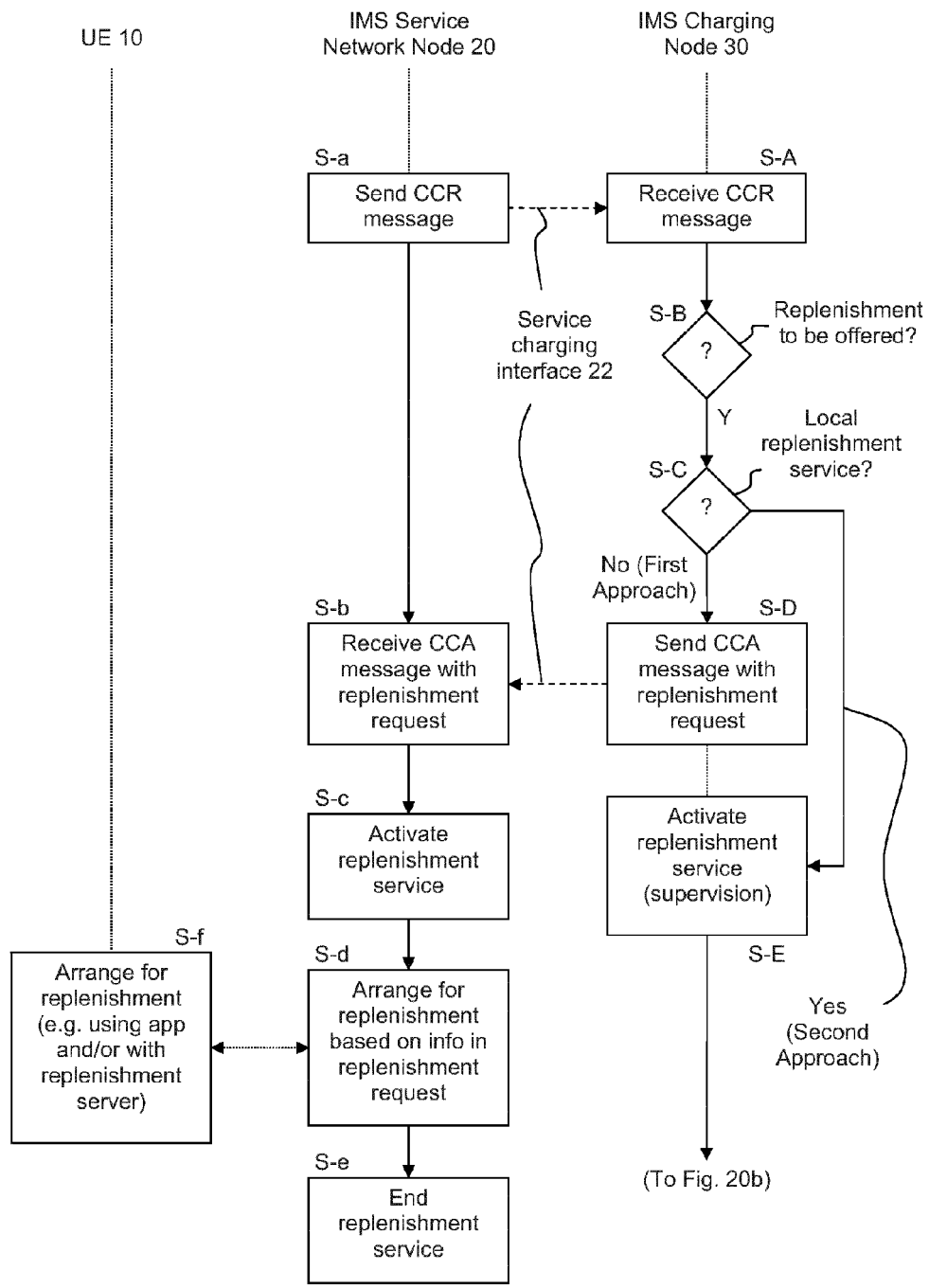

METHOD AND APPARATUS FOR ONLINE CHARGING IN AN IP MULTIMEDIA SUBSYSTEM

TECHNICAL FIELD

The present disclosure relates to a method and apparatus for online charging in an IP Multimedia Subsystem.

BACKGROUND

A significant proportion of the mobile users worldwide are prepaid users, having a pre-paid subscription with an operator. These users are required to do a refill (or top-up or replenishment) of their account in order to be able to use the prepaid subscription. It is also possible that a time limit is defined for the service, such that a refill must be done within a certain time period or else the prepaid account can no longer be used for calls. An operator could check the subscriber's account before allowing the subscriber to engage in a session and also to stop a session when the balance is depleted.

A number of possibilities exist for performing a refill for a prepaid user, for example using a voucher or a credit card or via a banking service on the Internet.

Some of these possibilities to do a refill are combined with the prepaid user performing some aspect of a voice call. One option available in current mobile networks is that the prepaid user is given the option to do a refill when a request to setup a call is done. Another available option is to give the user the option to do a refill when an established call has been cleared due to an empty account. In current mobile networks these services are often realized by using CAMEL (Customized Applications for Mobile Enhanced Logic) to a charging system which handles the service.

The CAMEL standard forms part of the GSM Network (ETSI) and the 3rd Generation Partnership Project (3GPP) specifications. CAMEL service triggers are defined and accessible by the Mobile Switching Center (MSC) in a GSM network. For example, when the MSC receives a call diversion request from a user and a corresponding CAMEL trigger is defined for the diverting user, the MSC contacts a CAMEL service using a CAMEL Application Part (CAP) request. The CAMEL service then provides the appropriate service for the call, such as call forwarding or diversion, for example.

The present applicant has appreciated that there is no solution for these services for mobile prepaid users in an IMS network when the interface between the MMTel AS and the OCS is Ro. In this respect, Ro is a Diameter interface which will now be briefly explained with reference to FIG. 6 of the accompanying drawings, in the context of other such interfaces.

FIG. 6 illustrates the IMS entities and interfaces involved with online and offline charging systems.

Ro is a Diameter interface used by the AS, MRFC, S-CSCF (or more generally nodes in a service network) to exchange online charging information with the OCS.

Gx is a Diameter interface used to exchange policy decisions-related information between the PCEF and PCRF.

Gy is a Diameter interface between the OCS and PCEF (or more generally nodes in a core network).

The user is charged for voice and video via the Ro interface and for data via the Gy interface. (Gy is used for flow based charging).

Rx is a Diameter interface used to exchange policy and charging related information between the P-CSCF and PCRF.

Rf is a Diameter interface used to exchange offline charging information with the CDF A functionality is covered in RFC 4006 (Diameter Credit Control) by including in a Final-Unit-Indication AVP the possibility to define Redirect as Final-Unit-Action and include a Redirect-Server AVP. The procedure described in RFC 4006 is called "graceful service termination" and covers only the case of replenishment after the final units have been consumed or for a new request and the account is empty (FUI included but no quota). The charging session remains during the replenishment and a new CCR(U) is sent to OCS after the replenishment.

However, with a solution only based on the use of FUI AVP, it will not be possible to create replenishment services for prepaid users which will give the user the same service level or better compared with the service in current mobile networks. The solution in RFC 4006 is more applicable to data than to MMTel services e.g. voice.

As well as RFC 4006 mentioned above, reference should also be made to RFC 3588 (Diameter Base Protocol), 3GPP TS 24.229 (Internet Protocol (IP) multimedia call control protocol based on Session Initiation Protocol (SIP) and Session Description Protocol (SDP); Stage 3), 3GPP TS 32.260 (IMS Charging), 3GPP TS 32.240 (Charging architecture and principles), 3GPP TS 32.299 (Telecommunication management; Charging management; Diameter charging applications).

SUMMARY

A method is proposed here for online charging within an IP Multimedia Subsystem, IMS. A first credit control request message is received at an IMS charging node from an IMS service network node over a service charging interface provided between the IMS service node and the IMS charging node. In response to receipt of the first credit control message, it is determined at the IMS charging node, with reference to one or more triggering conditions, that a replenishment of credit should or is to be offered for a user associated with the first credit control request message. Following such a determination, a credit replenishment service is initiated in the IMS service node by sending a replenishment request in a first credit control answer message over the service charging interface from the IMS charging node to the IMS service node, the first credit control answer message being in response to the first credit control request message. Alternatively, a credit replenishment service is initiated in the IMS charging node. In this alternative, a second credit control request message associated with the user is received from a transport network node over a bearer charging interface provided between the transport node and the IMS charging node; and, in response to receipt of the second credit control request message and as part of the replenishment service, a replenishment request is sent in a second credit control answer message over the bearer charging interface to the transport node, the second credit control answer message being in response to the second credit control request message.

The replenishment service may comprise arranging for an announcement to be provided to the user relating to the replenishment service.

The method may comprise, where the replenishment service is initiated at the IMS charging node, including information relating to the announcement in a credit control answer message sent from the IMS charging node to the IMS service node over the service charging interface in reply to the first credit control request message.

The replenishment service may comprise arranging for the user to be offered a choice between replenishing credit and continuing the service without replenishment.

The replenishment service may comprise arranging for the user to be directed to a replenishment server to enable the user to replenish credit.

The method may comprise providing information relating to the replenishment server in the first or second credit control answer message.

The information may comprise at least one of an address of a replenishment server, and a reason for replenishment.

Concerning the steps performed at the IMS service node, a credit control request message is sent from the IMS service node to the IMS charging node over the service charging interface provided between the IMS service node and the IMS charging node. Following the above-mentioned determination at the IMS charging node that a replenishment of credit should or is to be offered for a user associated with the credit control request message, a replenishment request is received at the IMS service node in a credit control answer message over the service charging interface, the credit control answer message being in response to the credit control request message. In response to receipt of the replenishment request at the IMS service node, a credit replenishment service is activated in the IMS service node. As part of the replenishment service, it is arranged at IMS service node for replenishment of credit based on information in the replenishment request.

The method may comprise sending a message from the IMS service node to the user's device to request that a replenishment application on the device is used to perform at least part of the replenishment service.

The credit control answer message may be a Diameter Credit Control Answer, CCA, message.

The credit control request message may be a Diameter Credit Control Request, CCR, message.

The IMS charging node may comprise an Online Charging System, OCS.

The IMS service node may comprise an Application Server.

The service charging interface may be a Diameter Ro interface.

The bearer charging interface may be a Diameter Gy interface.

An apparatus is proposed for online charging according to the above-described scheme within an IP Multimedia Subsystem, IMS. The apparatus is for use at an IMS charging node. The apparatus comprises: means (or a receiver/processor/circuitry/unit arranged or adapted) for receiving a first credit control request message from an IMS service network node over a service charging interface provided between the IMS service node and the IMS charging node. The apparatus comprises means (or a processor/circuitry/unit arranged or adapted) for, in response to receipt of the first credit control message, determining with reference to one or more triggering conditions that a replenishment of credit is required to be offered for a user associated with the first credit control request message. In one example, the apparatus comprises means (or a transmitter/processor/circuitry/unit arranged or adapted) for, following such a determination, initiating a credit replenishment service in the IMS service node by sending a replenishment request in a first credit control answer message over the service charging interface to the IMS service node, the first credit control answer message being in response to the first credit control request message. In another example, the apparatus comprises means (or a processor/circuitry/unit arranged or adapted) for, following such a determination, initiating a credit replenishment service in the IMS charging node. In this other example, the apparatus comprises means (or a receiver/processor/circuitry/unit arranged or adapted) for receiving a second credit control request message associated with the user from a transport network node over a bearer charging interface provided between the transport node and the IMS charging node; and means (or a transmitter/processor/circuitry/unit arranged or adapted) for, in response to receipt of the second credit control request message and as part of the replenishment service, sending a replenishment request in a second credit control answer message over the bearer charging interface to the transport node, the second credit control answer message being in response to the second credit control request message.

An apparatus is proposed for online charging according to the above-described scheme within an IP Multimedia Subsystem, IMS. The apparatus is for use at an IMS service node. The apparatus comprises: (a) means (or a transmitter/processor/circuitry/unit arranged or adapted) for sending a credit control request message to an IMS charging node over a service charging interface provided between the IMS service node and the IMS charging node. The apparatus comprises means (or a receiver/processor/circuitry/unit arranged or adapted) for, following a determination at the IMS charging node that a replenishment of credit is required to be offered for a user associated with the credit control request message, receiving a replenishment request in a credit control answer message over the service charging interface, the credit control answer message being in response to the credit control request message. The apparatus comprises means (or a processor/circuitry/unit arranged or adapted) for, in response to receipt of the replenishment request, activating a credit replenishment service in the IMS service node. The apparatus comprises means (or a processor/circuitry/unit arranged or adapted) for, as part of the replenishment service, arranging for replenishment of credit based on information in the replenishment request.

A program is also proposed for controlling an apparatus to perform a method as herein proposed, or which, when loaded into an apparatus, causes the apparatus to become an apparatus as herein proposed. The program may be carried on a carrier medium. The carrier medium may be a storage medium. The carrier medium may be a transmission medium. An apparatus programmed by such a program is also envisaged, as is a storage medium containing such a program.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

BRIEF DESCRIPTION OF THE DRAWINGS

FIGS. 12a, 12b, and 13 to 16 show signaling diagrams illustrating messages exchanged and steps performed in relation to a flexible announcement service;

FIGS. 20a and 20b illustrate schematically a method carried out according to an embodiment of the present invention;

DETAILED DESCRIPTION

First and second different (but related) approaches embodying the present invention will first be described in general terms, followed by a more detailed description of those two approaches.

The first approach is a voice centric approach which generally follows the architectural principles of IMS and also the principles for online charging at the Ro reference point, with the main functionality of the first approach being provided in the MMTel AS (though functionality is provided in or can be delegated to other nodes too).

In online charging, network resource usage is granted by the OCS based on the price or the tariff of the requested service and the balance in the subscriber's account. The OCS supports two types of online charging functions: session-based charging function (SBCF) and the event-based charging function (EBCF). The SBCF is responsible for network bearer and session-based services such as voice calls. GPRS sessions or IMS sessions. OCS is able to control session by allowing or denying a session establishment request after checking the subscriber's account.

IMS supports online charging capabilities through the OCS, where an IMS node or an AS interacts with the OCS in real time to process the user's account and controls the charges related to service usage.

It is currently not possible to support the replenishment service using the Ro interface.

Figure 1:
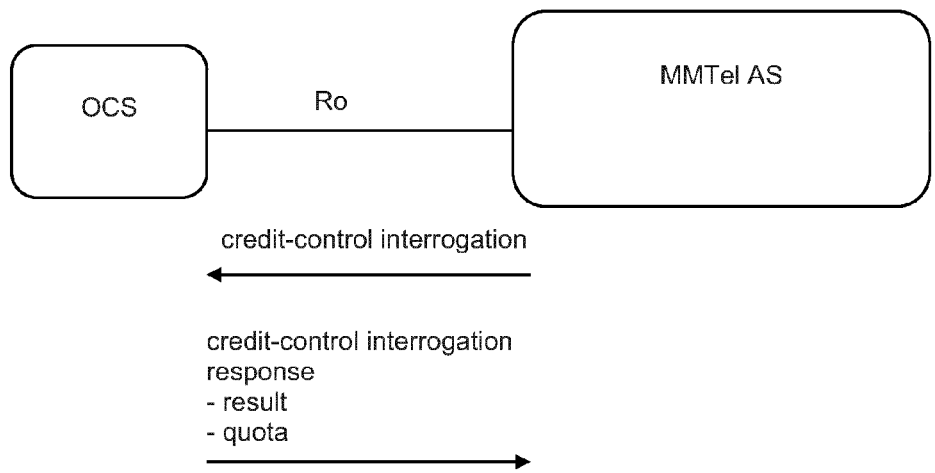
FIG. 1 is for use in explaining the messages passed over an Ro interface between an OCS and a MMTel AS in an online charging scenario.

An embodiment of the invention is based on the existing communication principles between OCS and an IMS node as shown in FIG. 1. To be able to support a replenishment service, a new service is defined in the AS, trigger points for the service defined in OCS and additions made to the protocol between OCS and AS.

The Trigger conditions in the OCS to request the replenishments service in the MMTel AS can be, for example:

Low balance i.e. a threshold for the account has been passed in OCS.
No credit
Account timer expiry
Service supervision expiry
It can also be related to the end of specific offers.

Figure 2:
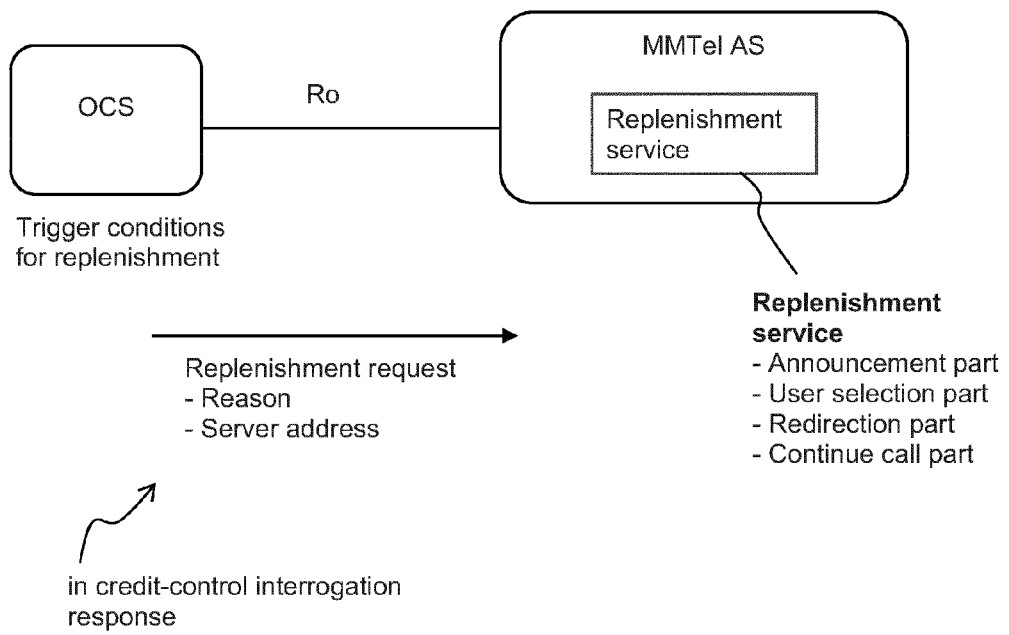
FIG. 2 is for use in explaining how an embodiment of the present invention proposes to include additional replenishment-related information in the credit control interrogation response message of FIG. 1.

As illustrated in FIG. 2, when an ordinary credit-control interrogation request is received at the OCS, either before the call is setup or during the call, the OCS will do the usual rating and processes. The result of this request can be successful i.e. quota is reserved or it can be unsuccessful. In addition to this, the OCS also checks for the trigger conditions for requesting the replenishment service. If the replenishment service is requested from the AS, the OCS adds this request in the interrogation response to the AS. The OCS can also include a reason-indication and a server-address to the refill-server.

The replenishment service in the AS consists of:
Announcement part
User selection part
Redirection part
Continue call part The AS sets up a connection and control that an announcement is sent to the user. The selection of the announcement is made in the AS and it can be based on the received reason-indication.

The user is given the option to do a refill immediately and, if the interrogation result was successful i.e. it included a quota, the option to continue with the call establishment.

If the user is given the option to continue the call and this option is selected, the call setup will continue as a normal MMTel call.

If the user selects the option to do a refill, the AS will do a re-direction and establish a connection to the refill server address received from OCS. Communication will then be between the user and the refill-server and the user can do a refill based on the refill possibilities available in the refill server e.g. voucher, credit card. The MMTel AS is still in the chain and can, if the interrogation request to OCS was successful, after a disconnection is received from the refill server continue with the call setup as a normal MMTel call.

The second approach is a service charging approach, with the main functionality in the OCS (though functionality is provided in or can be delegated to other nodes too).

With the second approach, the proposal is to use the fact that it is the OCS that has the knowledge about the status for a subscriber for account structure and the status on each account. The second approach takes account of the increasing use of smartphones as well as mobile broadband accesses and these devices will use a Gy interface to the OCS for mobile data charging. The second approach will now be described briefly with reference to FIGS. 7 and 8.

Figure 7:
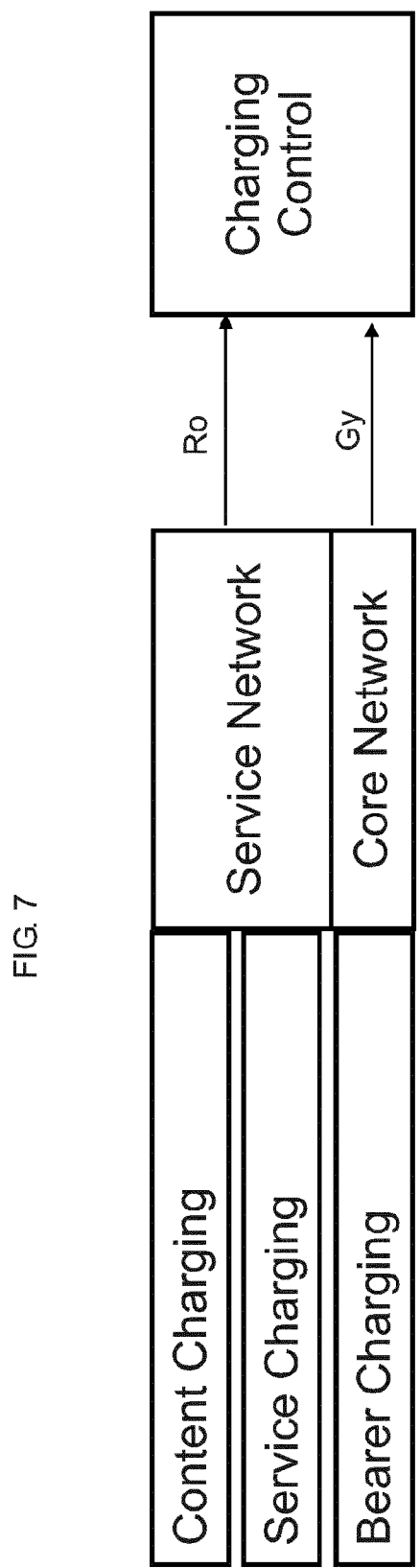
FIG. 7 illustrates three different types of charging: content charging, service charging (or communication charging) and bearer charging.

FIG. 7 illustrates three different types of charging: content charging, service charging (or communication charging) and bearer charging. In this respect, there are many different charging models in use—per event, per session, content-based and value-based, to name a few. However, they can generally be categorised into these three types or levels: content charging, service charging and bearer charging. Operators have flexibility in setting up the charging in the different levels for all different services, as the charging of many content and data services can and usually will be based on a combination of these levels.

Bearer charging occurs when the users are charged for the actual medium, which carries the service, rather than the service or the content being delivered over it. An example is charging for data bytes when customers use the wireless Internet. When using bearer charging it should be possible to zero-rate the service or content, or both.

Service charging occurs when the users are charged for the enabling service (for example, person-to-person text or picture messaging, streaming and location-based services). When using service charging it should be possible to zero-rate the bearer or content charging, or both.

Content charging occurs when the users are charged for the actual experience or value the users receive from the content and not the underlying technologies. Examples of content and data services that would benefit from this charging level are content-to-person MMS (such as sports clips) and mobile games. When using content charging it should be possible to zero-rate the bearer or service charging, or both.

FIG. 7 illustrates that content and service charging are generally associated with the service network, while bearer charging is associated with the core network. The Gy interface is used for bearer charging, while the Ro interface is used for content and service charging. For this reason, the term service charging used herein is intended to mean charging associated with the service network, i.e. content charging and/or service charging according to the above description, while the term bearer charging is intended to mean charging associated with the core network.

An assumption for the second approach is that the bearer charging for a subscriber is handled within the same OCS as the service charging (e.g. voice). The underlying idea is that triggers for offering a replenishment can be per service (e.g. voice) and when a replenishment is offered, the replenishment service is initiated by the OCS on the bearer level, i.e. over the Gy interface. It is the functionality in the OCS that combines the knowledge of the subscriber services on Service Network level and services on Core Network (Bearer level).

Figure 8:
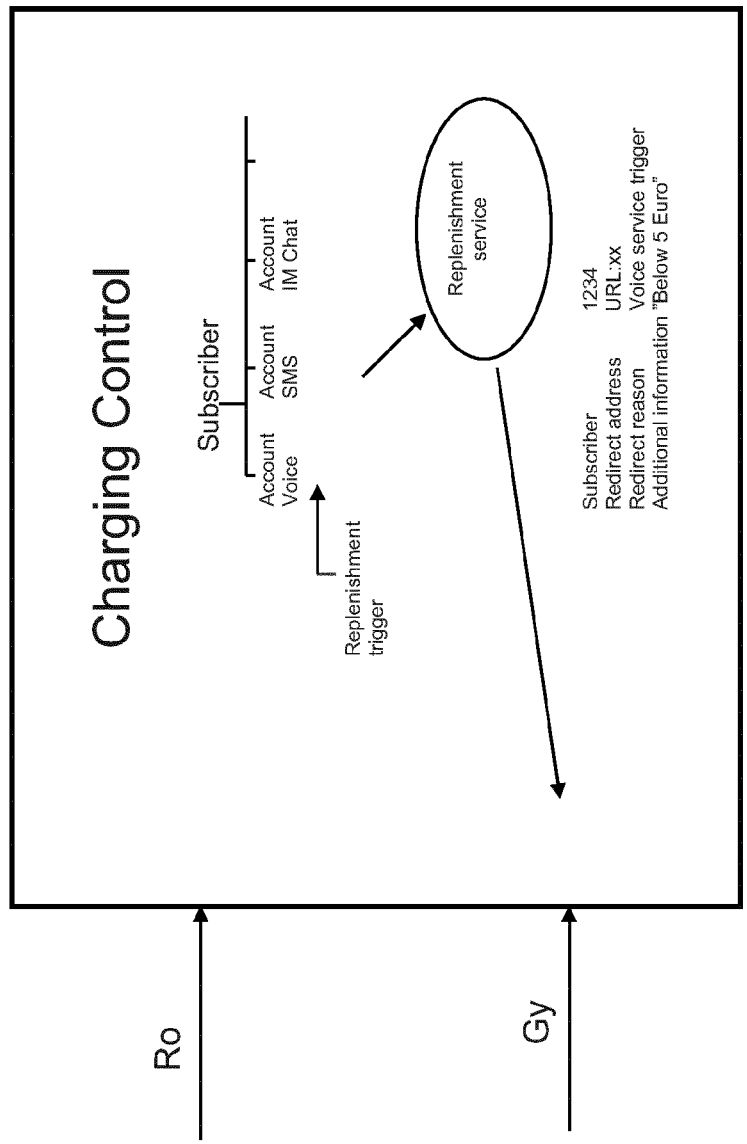
FIG. 8 is for use in explaining an embodiment of the present invention according to a second approach.

When a subscriber is using a service (e.g. voice) a charging session is established over Ro. The OCS will do the usual rating and processes and grant quota. If a trigger for replenishment has been set on the account and this value is reached, the "replenishment service" is activated. It is assumed that the subscriber has selected replenishment service on bearer level. Then the "replenishment service" collects information about the used service and reason for replenishment and activates a supervision for the subscriber on the Gy interface. This is illustrated in FIG. 8. When the next request over Gy is received for this subscriber (either a new charging session or a new request for a new service/rating group in an established charging session), the OCS will request a redirect over Gy and supply a redirect address and information related to the redirect (this can be considered to be equivalent in some ways to the replenishment request of FIG. 2, though the replenishment request here is not directed at the replenishment service because that is based at the OCS). The redirect can be done to a top-up server (replenishment portal) and the reason to the replenishment offer can be provided to the user.

It should be noted that it is not necessarily the user which when establishing the IMS session generates the credit control request over Ro which triggers the replenishment that subsequently receives the replenishment offer over Gy. Where several accounts are linked in an account structure, as for example for family accounts, a child using its account and setting up an IMS session may trigger a subsequent replenishment towards a parent having a parent account. As a further example, the child account can be prepaid while the parent account is post-paid. For Gy to be utilized the parent will utilize a so-called smart phone, or other data capable device which uses Gy as charging interface.

Figure 20B:
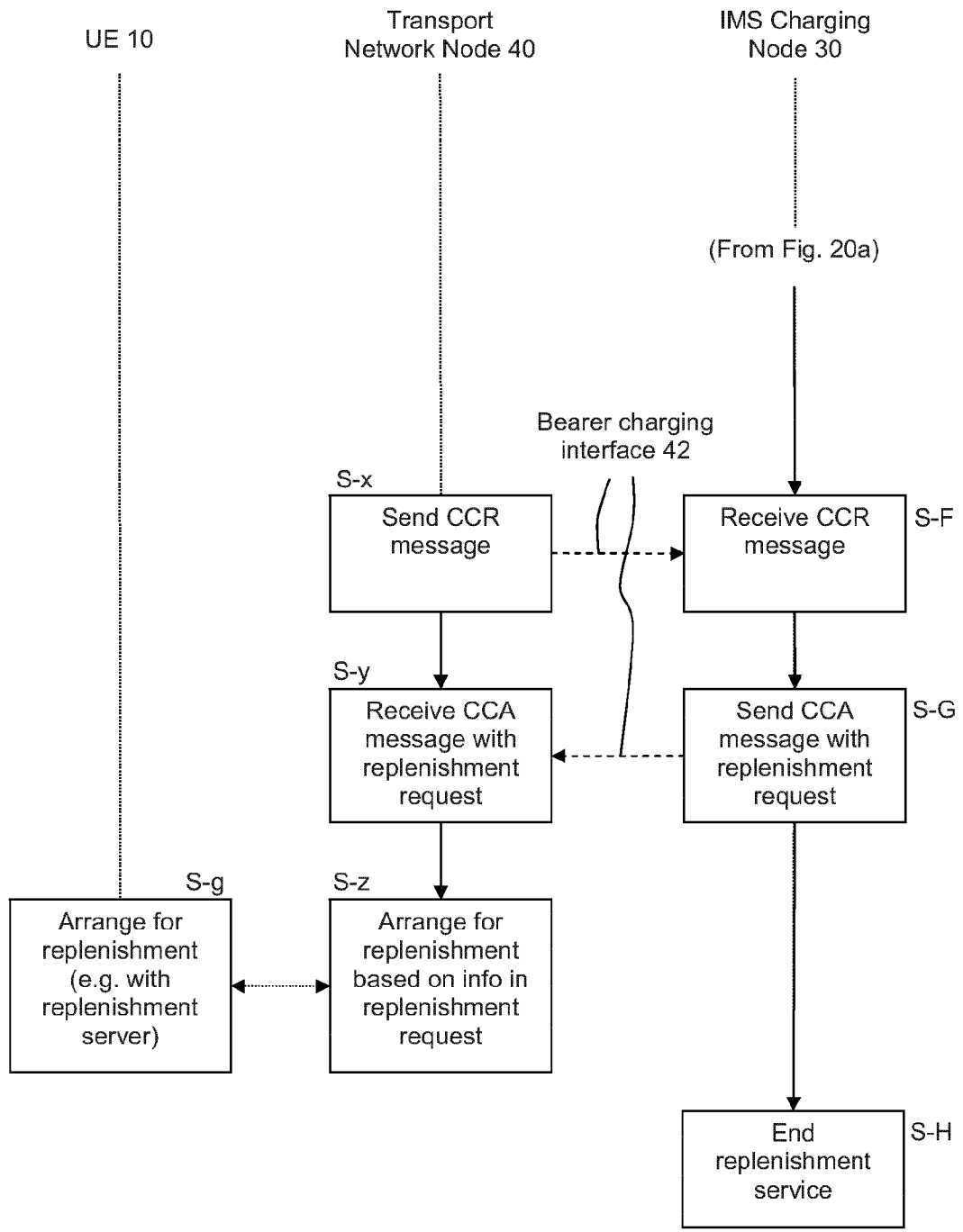

These two approaches to online charging within an IP Multimedia Subsystem are summarized schematically in the flowchart of FIGS. 20a and 20b. These figures show the steps performed by a UE 10, an IMS service network node (e.g. AS) 20, an IMS charging node (e.g. OCS) 30, and an IMS transport network node (e.g. GGSN/P-GW) 40. Components of the IMS service network node 20 and IMS charging node 30 are illustrated schematically in FIG. 21.

In step S-a the IMS service node 20 sends a first credit control request message to the IMS charging node 30 over a service charging (e.g. Ro) interface 22 provided between the IMS service node 20 and the IMS charging node 30.

In step S-A the first credit control request message is received at the IMS charging node 30 from the IMS service node 20 over the service charging interface 22. In response to receipt of the first credit control message, in step S-B it is determined by the IMS charging node 30, with reference to one or more triggering conditions, that a replenishment of credit should or is to be offered for a user associated with the first credit control request message.

What happens following step S-B depends on whether the first approach or the second approach is being employed. Differentiation between these two approaches is illustrated schematically in FIG. 20a as being performed in step S-C. In step S-C, it is determined whether the replenishment service is based in the IMS service node 20, in which case the first approach is employed, or whether the replenishment service is based in the IMS charging node 30, in which case the second approach is employed. It is to be appreciated that this step S-C may not be performed in practice, but may be performed implicitly or may be hard-wired in the IMS charging node 30 such that the first approach or the second approach is taken without any check being required.

Following such a determination in step S-B, when the first approach is being employed the IMS charging node 30 initiates a credit replenishment service in the IMS service node 20 by sending in step S-D a replenishment request in a first credit control answer message over the service charging interface 22 to the IMS service node 20, the first credit control answer message being in response to the first credit control request message. In step S-b the replenishment request is received at the IMS service node 20 over the service charging interface 22. In response to receipt of the replenishment request, in step S-c a credit replenishment service is activated in the IMS service node. As part of the replenishment service, in step S-d the IMS service node 20 arranges for replenishment of credit based on information in the replenishment request. The UE 10 is involved in the replenishment of credit in step S-f; as described in further detail below, this may involve the use of an application (or "app") on the device, and/or may involve communicating with a replenishment server; details of the replenishment server may be passed as part of the replenishment request in the credit control answer sent in step S-D.

When the second approach is being employed, following such a determination in step S-B a credit replenishment service is initiated or activated in the IMS charging node 30 in step S-E, initially in "supervision" mode. A second credit control request message associated with the user is subsequently sent by the transport node 40 in step S-x. In step S-F the second credit control request message associated with the user is received from the transport node 40 over a bearer charging (e.g. Gy) interface 42 provided between the transport node 40 and the IMS charging node 30. In response to receipt of the second credit control request message and as part of the replenishment service, a replenishment request is sent in step S-G in a second credit control answer message over the bearer charging interface 42 to the transport node 40, the second credit control answer message being in response to the second credit control request message. The second credit control answer message is received at the transport node 40 in step S-y. In step S-z the transport node 40 arranges for replenishment of credit based on information in the replenishment request. The UE 10 is involved in the replenishment of credit in step S-g.

The credit control request and answer messages are abbreviated in FIGS. 20a and 20b to CCR and CCA messages respectively; this is not intended to limit these to being Diameter Credit Control Request and Answer messages respectively, though they could be.

Figure 21:
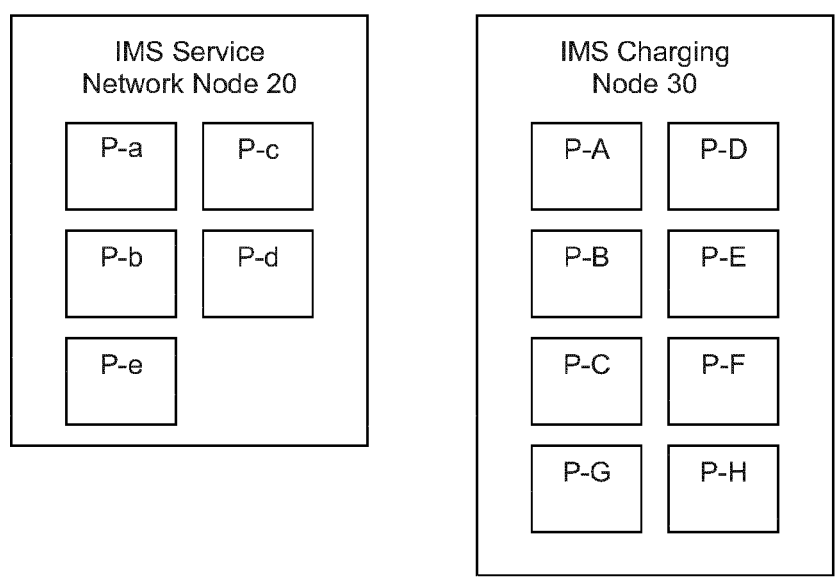
FIG. 21 illustrates schematically apparatus for performing a method according to an embodiment of the present invention.

Components of the IMS service network node 20 and IMS charging node 30 are illustrated schematically in FIG. 21. The IMS service network node 20 comprises components (e.g. processors/receivers/transmitters) P-a to P-e arranged or adapted to perform steps S-a to S-e respectively. The IMS charging node 30 comprises components (e.g. processors/receivers/transmitters) P-A to P-H arranged or adapted to perform steps S-A to S-H respectively.

It will be appreciated that operation of one or more of the above-described components can be provided in the form of one or more processors or processing units, which processing unit or units could be controlled or provided at least in part by a program operating on the device or apparatus. The function of several depicted components may in fact be performed by a single component. A single processor or processing unit may be arranged to perform the function of multiple components. Such an operating program can be stored on a computer-readable medium, or could, for example, be embodied in a signal such as a downloadable data signal provided from an Internet website. The disclosure is to be interpreted as covering an operating program by itself, or as a record on a carrier, or as a signal, or in any other form.

Figure 22:
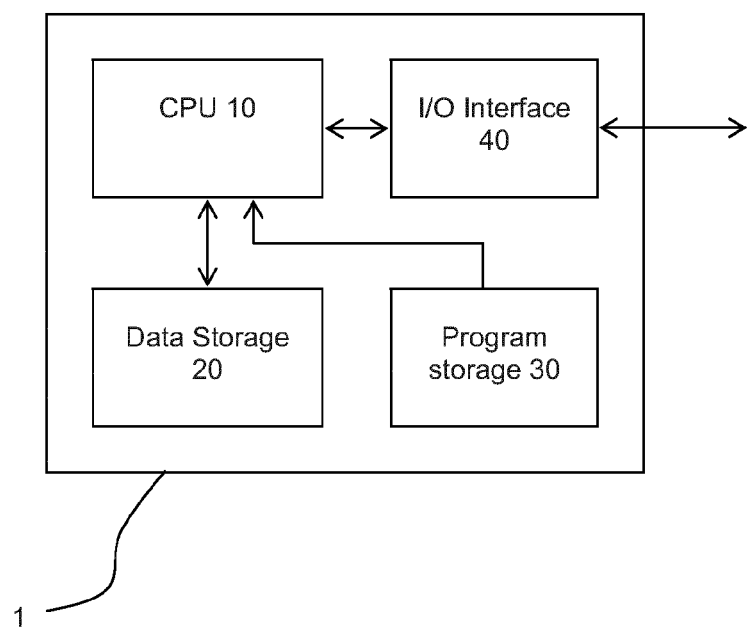
FIG. 22 illustrates schematically a node in which an embodiment of the present invention can be implemented.

FIG. 22 is a schematic illustration of a node 1 in which a technique described herein can be implemented. A computer program for controlling the node 1 to carry out a method as described herein is stored in a program storage 30. Data used during the performance of a method as described herein is stored in a data storage 20. During performance of a method as described herein, program steps are fetched from the program storage 30 and executed by a Central Processing Unit (CPU) 10, retrieving data as required from the data storage 20. Output information resulting from performance of a method as described herein can be stored back in the data storage 20, or sent to an Input/Output (I/O) interface 40, which may comprise a transmitter for transmitting data to other nodes, as required. Likewise, the Input/Output (I/O) interface 40 may comprise a receiver for receiving data from other nodes, for example for use by the CPU 10.

More detailed examples will now be described relating to the above-mentioned first approach, with reference to FIGS. 3 and 4, of using such a technique to provide a service level equivalent to current intelligent network (CAMEL-based) mobile networks.

Figure 3A:
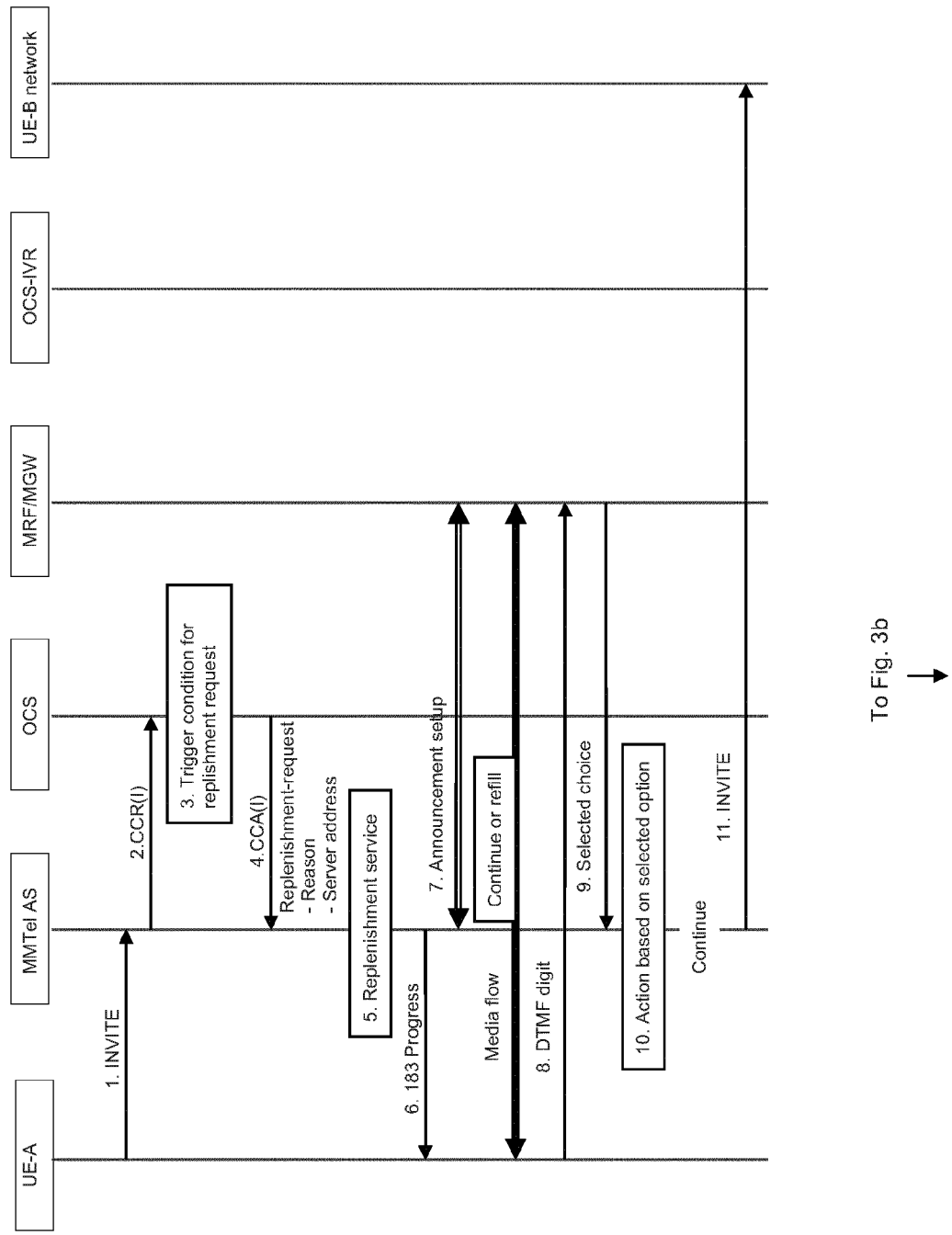
FIGS. 3a and 3b show a signaling diagram illustrating messages exchanged and steps performed according to an embodiment of the present invention (first approach; replenishment at call setup)
Figure 3B:
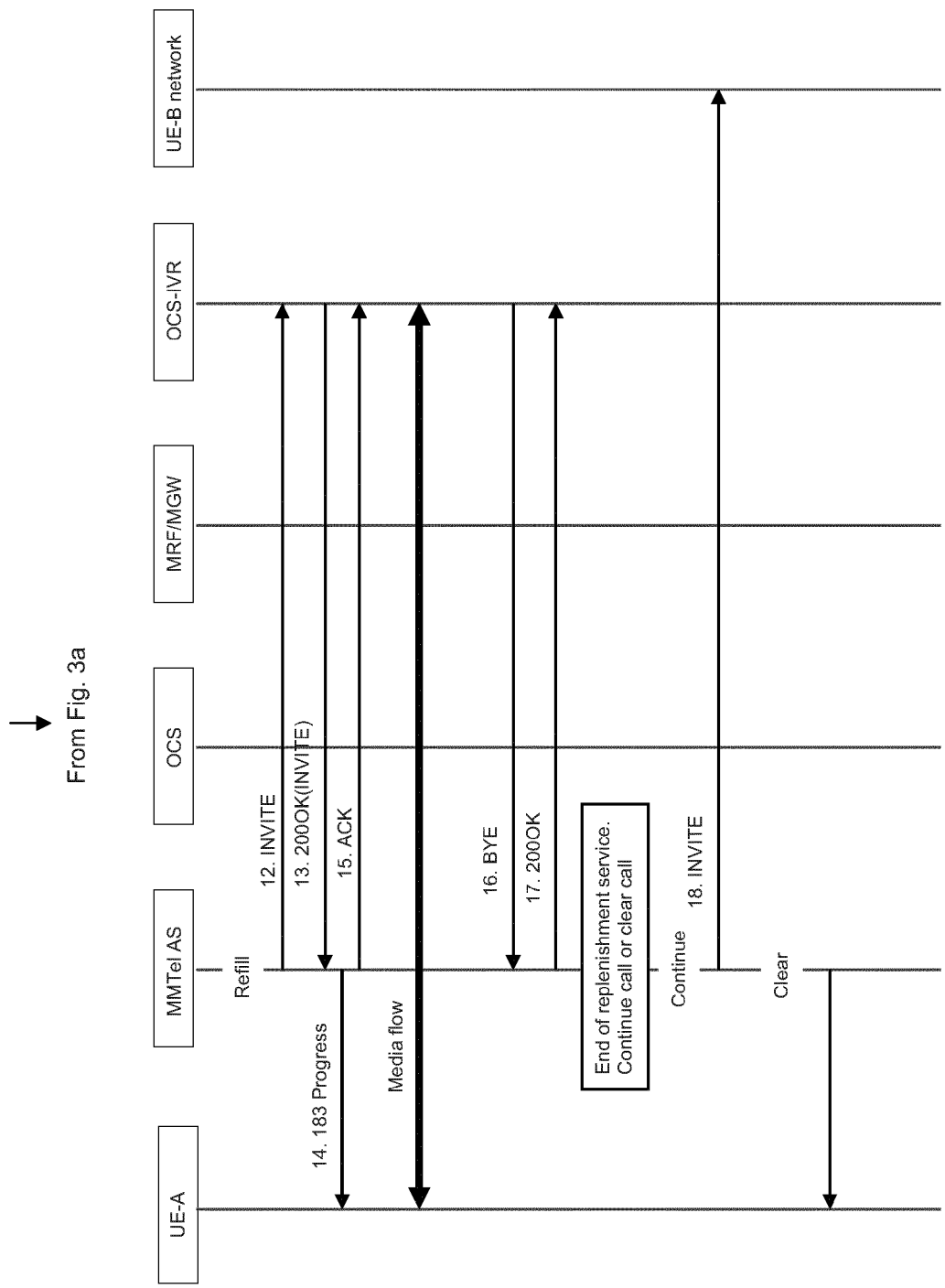
Figure 4A:
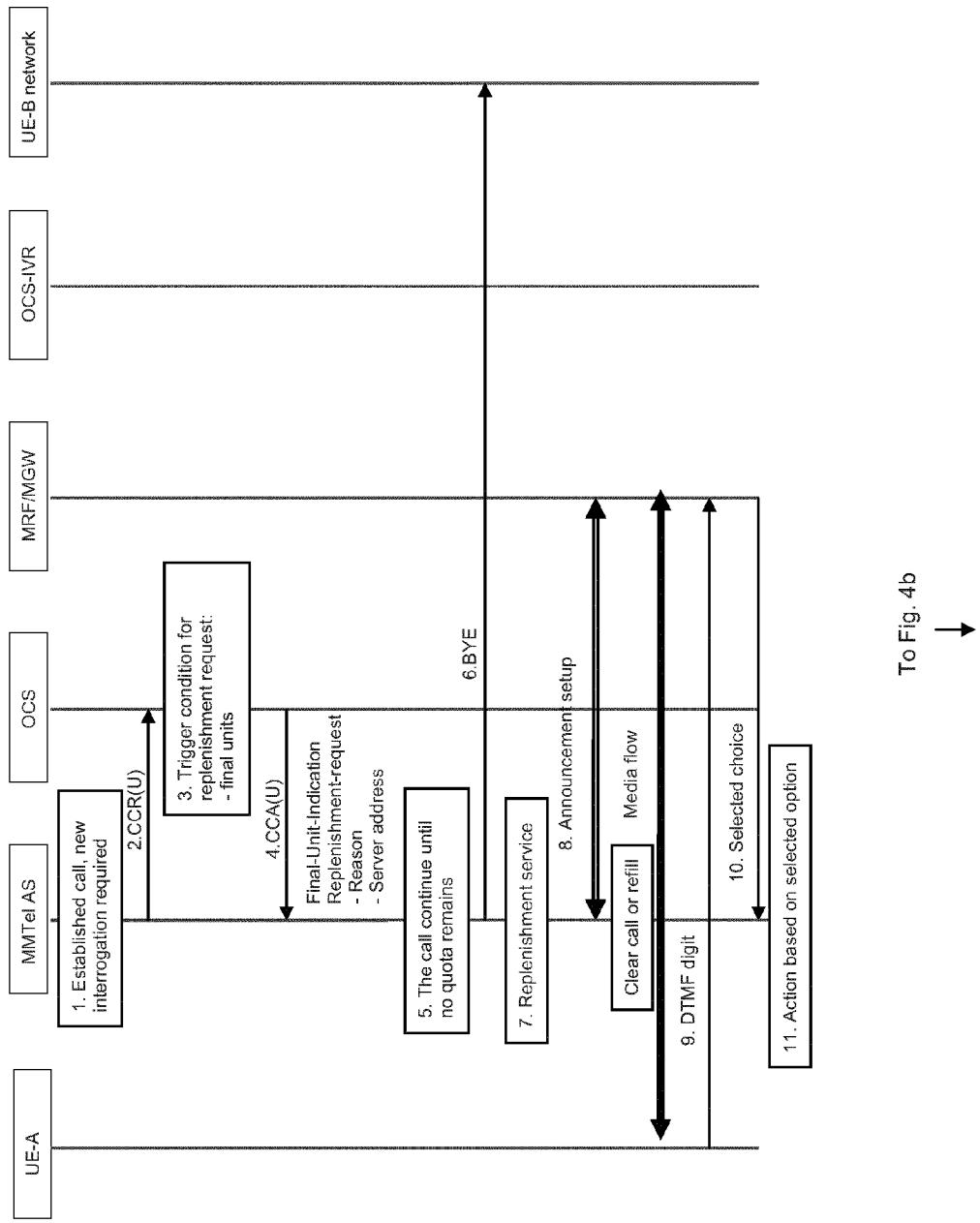
FIGS. 4a and 4b show a signaling diagram illustrating messages exchanged and steps performed according to an embodiment of the present invention (first approach; replenishment at end of call)
Figure 4B:
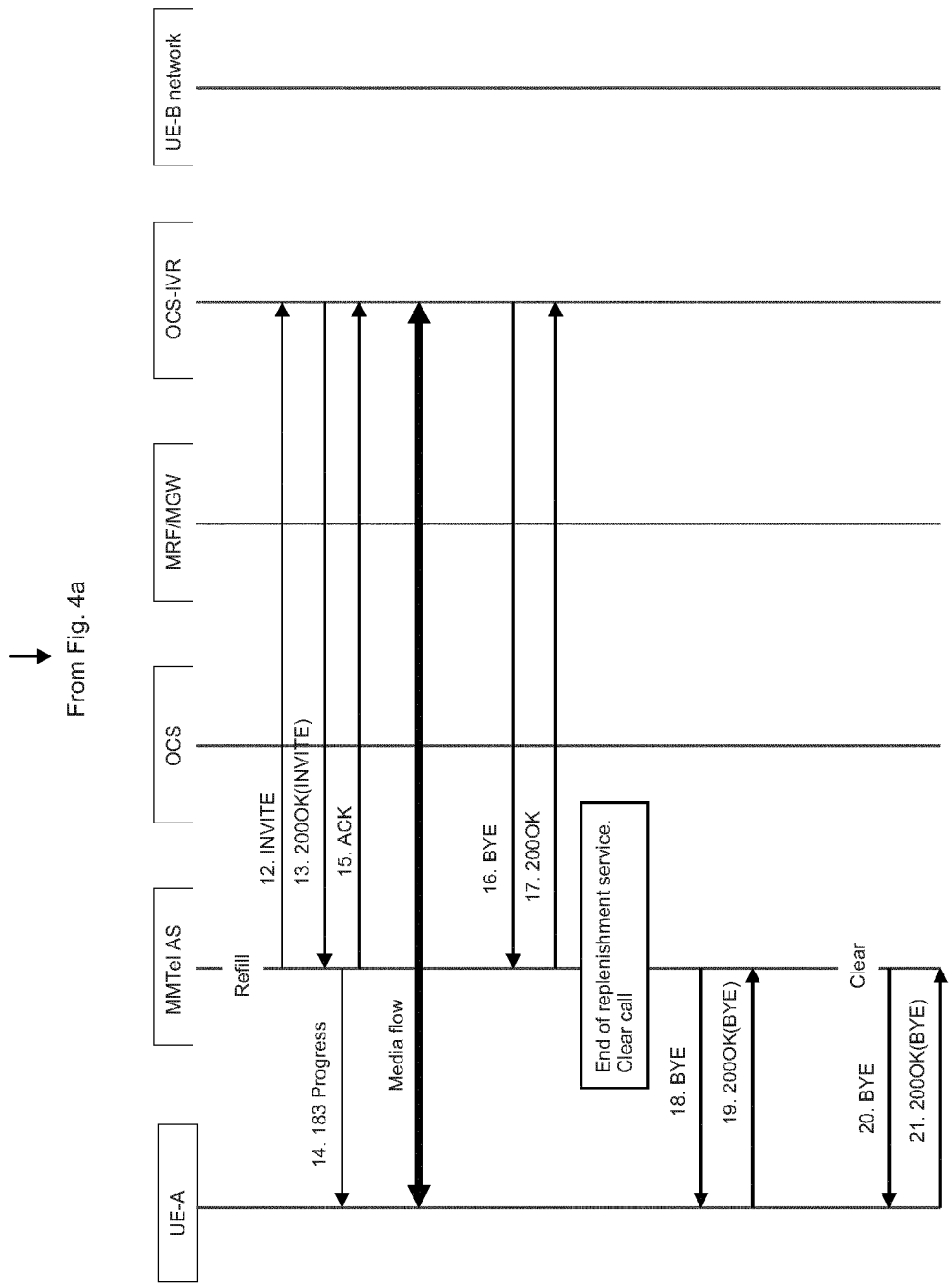

The example of FIG. 3 relates to the provision of a replenishment service at call setup, while FIG. 4 relates to the provision of a replenishment service at the end of a call (or when credit is depleted).

The steps in FIG. 3 (replenishment at call setup) are as follows:

1. MMTel AS receives an INVITE. The originating subscriber is an online charging user i.e. an address to OCS is included in PCFA.
2. MMTel AS collects the available charging information and sends an CCR(I) to the OCS.
3. OCS will do a rating based on the received information and check account status. OCS will have the knowledge that the subscriber is a prepaid user. If the
   Replenishment service is possible to request from the AS, OCS will check if some of the trigger conditions for the replenishments service is fulfilled.
   Trigger conditions in OCS to request the replenishments service in the MMTel AS can for example be:
   Low balance i.e. a threshold for the account has been passed in OCS.
   No credit
   Account timer expiry
   Service supervision expiry
4. In addition to the normal interrogation result included in CCA(I), OCS will also add an Replenishment request including a reason and an address to a refill server. The selection of the refill server can be based on the subscriber profile in OCS or the service profile.
   The Replenishment request is carried in a new grouped AVP.
5. If a Replenishment service is available and active in the MMTel AS, the result of the interrogation is stored and the Replenishment service is started.
   The MMTel AS will select an announcement to send to the originating user. The selection can be based on the Reason-indication received from OCS. If no reason-indication is available from OCS, MMTel AS can base the selection of announcement on other information received from OCS e.g. Low-Balance-Indication AVP.
6. A connection is established towards the originating user by sending 183 Progress.
7. MMTel AS will establish a connection to a MRF/MGW and inform which announcement to play. An MRF is a function which provides media related functions such as media manipulation and playing of tones and announcements.
8. As part of the announcement, the originating user is given the option to do a refill or continue the call setup. The user selection is indicated by a DTMF digit to the MRF/MGW.
9. The MRF/MGW indicates to the MMTel AS which option the originating user has selected.
10. MMtel AS selects the action to execute based on user selection.
11. If the user has selected to continue the call, the MMTel AS leaves the replenishment service and the call setup continue with an INVITE towards the terminating side.
12. If the user selected to do a refill, the MMTel AS establish a connection towards the refill server by sending an INVITE with the address received from the OCS.
13. The Refill server (OCS-IVR, where IVR stands for Interactive Voice Response) will answer with a 200OK(INVITE).
14. MMTel AS will update the connection towards the originating user with a 183 Progress.
15. MMTel AS sends an ACK to the Refill server.
    Communication between the user and the refill server is now possible.
16. After the refill, the connection is released by the refill server by sending a BYE towards the originating user.

The announcement played at 7 could indicate to the originating user that the call could continue after the refill and in that case the user should not clear down after the refill.
17. MMTel AS sends 200OK(BYE) to towards the Refill server to clear the connection.
18. MMtel AS can identify that this call setup can continue after the refill. In that case the MMTel AS leaves the replenishment service and continue the call setup by sending an INVITE towards the terminating side.
If the call setup can not continue i.e. no quota received in the interrogation result the MMTel AS can either clear the call towards the originating user or do a new interrogation towards the OCS to get quota.

An alternative is what is illustrated in FIG. 3 is to configure the refill server addresses within the Replenishment service in the MMTel AS. If the selected server is based on operator (wholesale case) it could be an option to have this configured in MMTel AS as also the announcements decided by MMTel could be defined per operator.

A further example based on the first approach will now be described with reference to FIG. 4. This further example is one in which replenishment is triggered at the end of a call.

The steps in FIG. 4 are as follows:
1 An established call exists. MMTel AS will do a new interrogation to OCS for new quota.
2. MMTel AS sends an CCR(U) to the OCS.
3 OCS will do a rating based on the received information and check account status. OCS will have the knowledge that the subscriber is a prepaid user. If the Replenishment service is possible to request from the AS, OCS will check if some of the trigger conditions for the replenishments service is fulfilled.
Trigger conditions in OCS to request the replenishments service in the MMTel AS can for example be:
Low balance i.e. a threshold for the account has been passed in OCS.
No credit
Account timer expiry
Service supervision expiry
4 In addition to the normal interrogation result included in CCA(U), OCS will also add an Replenishment request including a reason and an address to a refill server. The selection of the refill server can be based on the subscriber profile in OCS or the service profile.
The Replenishment request is carried in a new grouped AVP.
As it is the final granted quota for this service, the CCA(U) will also include the Final-Unit-Indication AVP.
5 If a Replenishment service is available and active in the MMTel AS, the ongoing call will continue and the Replenishment service will start after the ongoing call.
6 The quota is exhausted and the MMTel AS disconnect the non-served party.
7 The Replenishment service is activated.
The MMTel AS will select an announcement to send to the originating user. The selection can be based on the Reason-indication received from OCS. If no reason-indication is available from OCS, MMTel AS can base the selection of announcement on other information received from OCS.
8 MMTel AS will establish a connection to a MRF/MGW and inform which announcement to play.
9 As part of the announcement, the originating user is given the option to do a refill or terminate the call. The user selection is indicated by a DTMF digit to the MRF/MGW.
10 The MRF/MGW indicates to the MMTel AS which option the originating user has selected.
11 MMtel AS selects the action to execute based on user selection.
12 If the user selected to do a refill, the MMTel AS establish a connection towards the refill server by sending an INVITE with the address received from the OCS.
13 The Refill server (OCS-IVR) will answer with a 200OK (INVITE).
14 MMTel AS will update the connection towards the originating user with a 183 Progress.
15 MMTel AS sends an ACK to the Refill server.
Communication between the user and the refill server is now possible.
16 After the refill, the connection is released by the refill server by sending a BYE towards the originating user.
17 MMTel AS sends 200OK(BYE) to towards the Refill server to clear the connection.
18 MMtel AS ends the replenishment service and terminates the call.
19 200OK(BYE) received from served user.
20 If the user has selected to terminate the call, the MMTel AS leaves the replenishment service and terminates the call.

Figure 5:
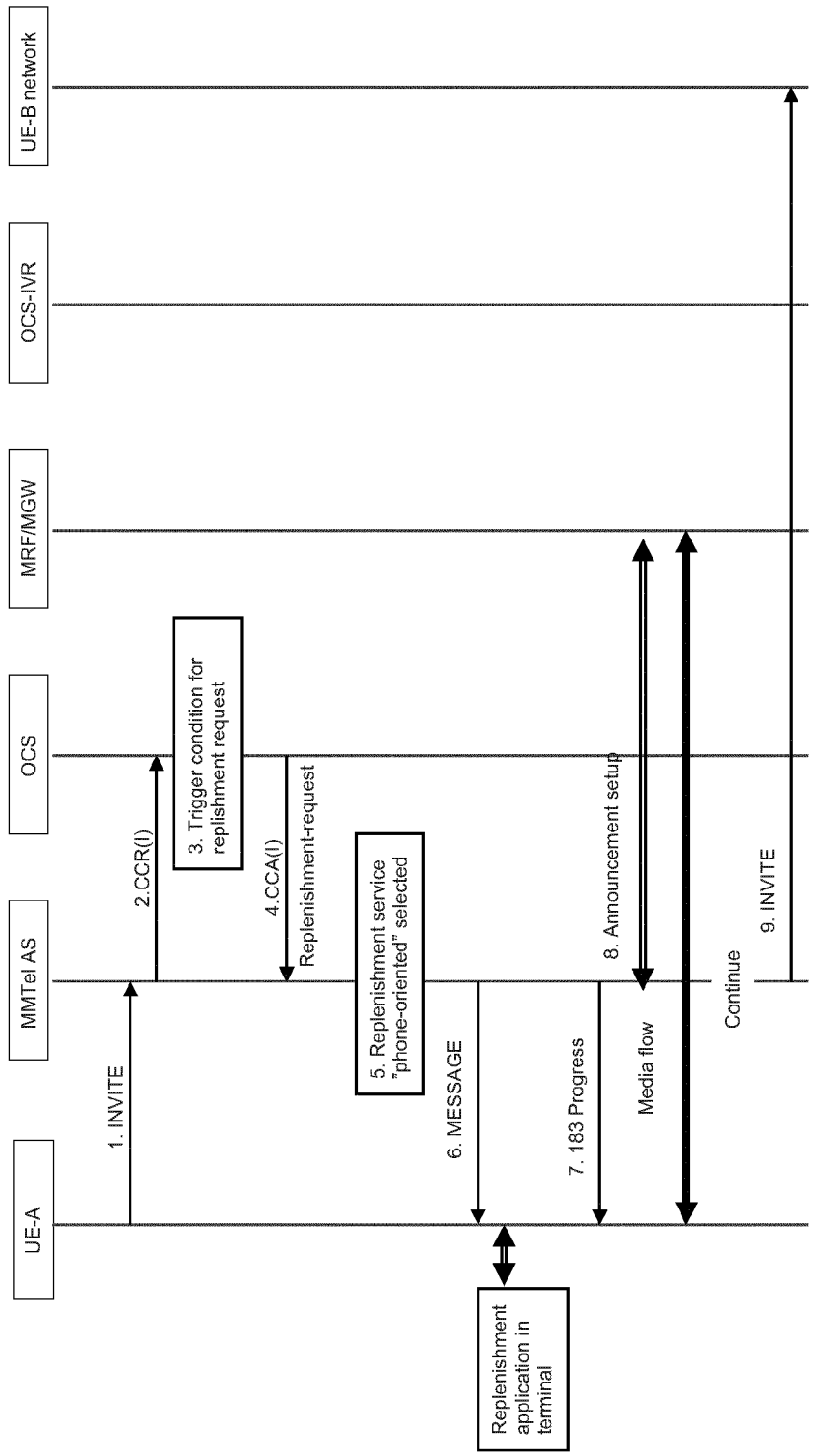
FIG. 5 shows a signaling diagram illustrating messages exchanged and steps performed according to an embodiment of the present invention (first approach; replenishment at call setup; use of an application at the user terminal)
Figure 6:
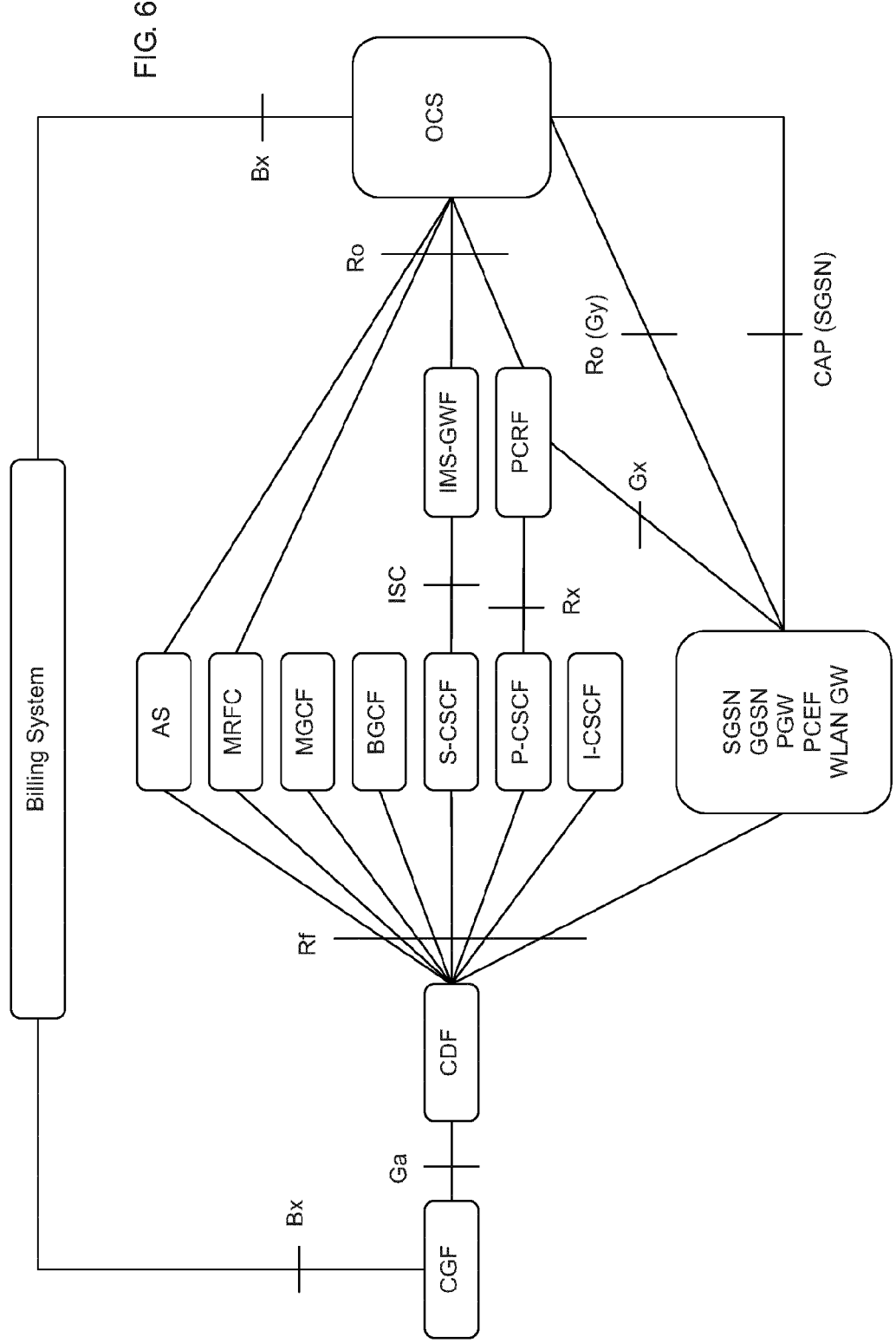
FIG. 6, discussed hereinbefore, illustrates the IMS entities and interfaces involved with online and offline charging systems.

By using the capabilities in the IMS network as well as capabilities in the terminal it is also possible to enhance the service level towards the served user for the replenishment service. In the MMTel AS a selection can be based on terminal capabilities as well as subscriber preferences and ongoing service to use the replenishment procedure described above or an enhanced alternative. The enhanced procedure could be that the Replenishment service in MMTel AS will send an SIP MESSAGE to the terminal. This SIP method will include information to start an application for Replenishment in the terminal. At the same time the SIP MESSAGE is sent it is also possible to send an announcement to the served party if the ongoing service is audio/video. FIG. 5 shows such a scheme in the context of a session-based charging session but it is also possible to initiate the replenishment service for an event based charging session.

A more detailed example will now be described relating to the above-mentioned second approach, with reference to FIGS. 9 and 10.

Figure 9:
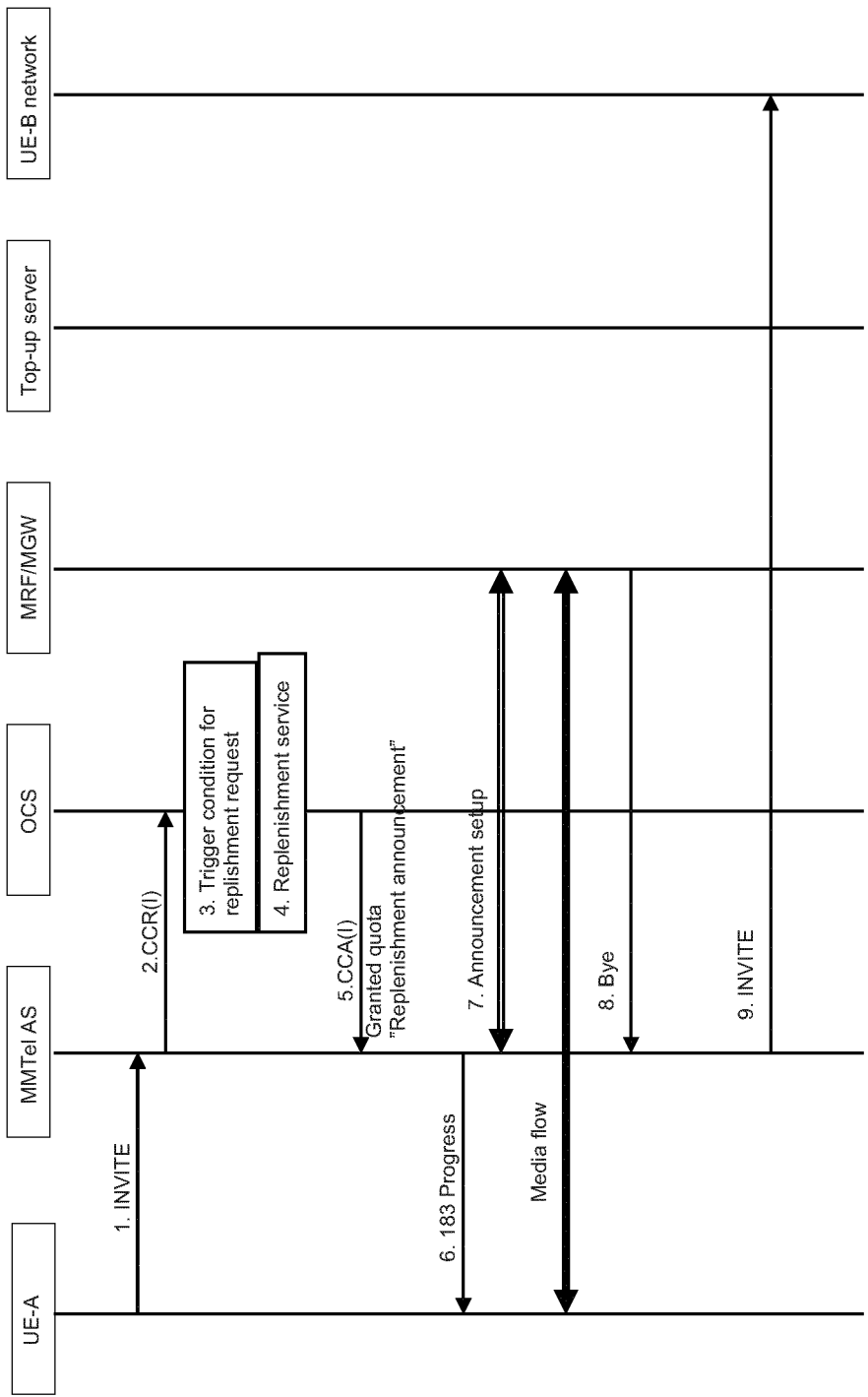
FIGS. 9 and 10 show a signaling diagram illustrating messages exchanged and steps performed according to an embodiment of the present invention (second approach; replenishment at call setup)

The example in FIG. 9 shows activation of the replenishment service in OCS at an MMTel call setup. The replenishment trigger in OCS can in general activate the replenishment service any time during a charging session.

FIG. 9 illustrates the following steps:
1 MMTel AS receives an INVITE. The originating subscriber is an online charging user i.e. an address to OCS is included in PCFA.
2 MMTel AS collects the available charging information and sends an CCR(I) to the OCS.
3 OCS will do a rating based on the received information and check account status. OCS will have the knowledge that the subscriber is a prepaid user. OCS will check if some of the trigger conditions for the replenishments service are fulfilled.
Trigger conditions in OCS to request the replenishments service in the MMTel AS can for example be:
Low balance i.e. a threshold for the account has been passed in OCS.
No credit
Account timer expiry
Service supervision expiry
4 The replenishment service is activated in OCS. The originating user has indicated that the replenishment offer shall be indicated on a device using the data capabilities on the bearer level and is using the Gy towards the OCS. (It is not necessary that the mobile data access is pre-paid). The replenishment service in OCS stores the information related to the replenishment trigger (reason, level etc). A supervision is started towards charging requests received from Gy for this subscriber. (action 4 can be in parallel to action 5)

5 A CCA(I) is sent to the MMTel AS with the granted quota. If it is an MMTel service it is possible to also include an replenishment announcement in the CCA(I) for example according to the "flexible announcement" procedure (to be described in more detail below). An example could be "Your account is low. Replenishment is offered on your data access".

6 A connection is established towards the originating user by sending 183 Progress.

7 MMTel AS will establish a connection to a MRF/MGW and inform which announcement to play.

8 Disconnection after the announcement.

9 The MMTel call establishment continues.

Figure 10:
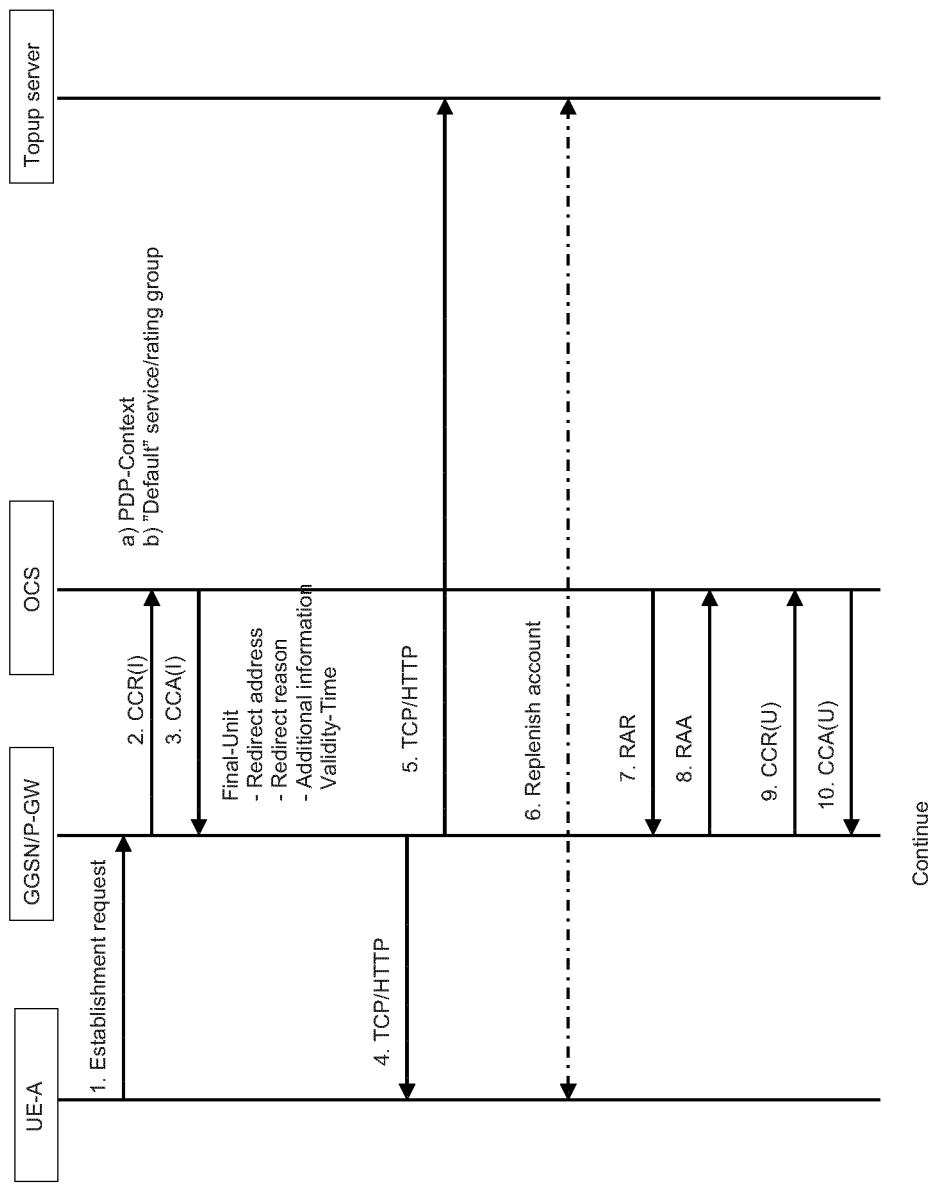

FIG. 10 shows a subsequent procedure involving the OCS and a GGSN (or P-GW), beginning with a request to establish a data connection:

1 The user is establishing a data connection.

2 The GGSN/P-GW sends a CCR(I) to OCS over Gy. The first request can be for only the "default" service (no active service/rating group) or also for one or more services/rating groups.

The replenishment service in OCS can use either the "default" service or a specific pre-defined service/rating group for creating a redirect to a replenishment server. This example relates to the case when the "default" service is used.

When the CCR(I) is received in OCS for a user with a waiting replenishment request, the OCS will use the stored information from the replenishment trigger time (reason and additional information) and preconfigured information for the redirect address.

OCS will answer with a CCA(I) and include a Final-Unit-Indication AVP with Redirect-Address and Redirect-Reason If the subscriber has on ongoing charging session using Gy. OCS can force the client to initiate new CCR:s by sending a RAR to the client.

3 OCS will answer with a CCA(I) and include a Final-Unit-Indication AVP with Redirect-Address and Redirect-Reason as well as a Validity-Timer.

4 Connection established towards the user equipment.

5 Connection established towards the Replenishment server.

6 Replenishment can be offered by using e.g. a portal. The information to the user for the replenishment offer can be "Your account for voice service is below 5 Euro. A replenishment is recommended".

It can be build based on the service triggering the replenishment request and the reason.

The user can do the replenishment of the account.

7 OCS will after a predefined time send a re-authorization request (RAR) to the GGSN/P-PGW 8 GGSN/P-GW answer with a RAA.

9 The re-authorization request forces the client to do a new request for quota (CCR(U)) from the OCS for the service/rating groups active for the charging session.

10 OCS will respond with a CCA(U) with new quota for the requested services/rating groups.

An embodiment according to the second approach uses the basic redirect function as defined in RFC4006 with some enhancements to cater for more detailed service specific information.

With the second approach, the replenishment can be handled outside the service (e.g. voice, SMS) causing the request.

The replenishment service above is described as having an announcement part. The announcement given to the user in the announcement part can be divided into two parts. One part is decided by the OCS by using a "flexible announcement service" (to be described in more detail below) and one part decided by the MMTel AS. The part of the announcement in which options are given to the user is controlled by the MMTel AS.

By giving the OCS the possibility to define the announcement sent to the originating user, it is possible to include variables in the announcement and therefore enhance the information given to the user.

An example could be that the account will expire in two days. The OCS can then define the first part of the announcement with "Your account will expire in "2" days". The second part of the announcement handling is then defined and controlled by the MMTel AS as part of the replenishment service. An example could be "Would you like to do a refill now press 0 or would you like to continue the call press 1".

The background to and detail of the flexible announcement service will now be described.

With intelligent network (IN) solutions it is common that the OCS used has the capability to initiate call announcements towards the prepaid user. These announcements can be generated before call setup (pre-call announcements), during a call or at the end of the call. Pre-call announcements are used for a variety of reasons (e.g. welcome message, account balance information, barring reason). Announcement during a call is often a short warning that the account balance is very low (call out off warning, often in a form of a tone) and announcement at the end of the call is used when the call has been cut off due to empty account.

No general solution exists for these announcement services for mobile prepaid users in an IMS network when the interface between the Multimedia Telephony Service (MMTel) application server (AS) and the OCS is Ro.

An AS can produce some announcements based on information received in attribute value pairs (AVP) from OCS. Announcements can primarily be based on Low-Balance-Indication AVP, Final-Unit-Indication AVP and the received result-code.

The "flexible announcement service" proposed herein is generally intended to follow the architectural principles of IP Multimedia Sub-system (IMS) and also the principles for online charging at the Ro reference point.

In online charging, network resource usage is granted by the OCS based on the price or the tariff of the requested service and the balance in the subscriber's account. The OCS supports two types of online charging functions: session-based charging function (SBCF) and the event-based charging function (EBCF). The SBCF is responsible for network bearer and session-based services such as voice calls. GPRS sessions, or IMS sessions. The OCS is able to control session by allowing or denying a session establishment request after checking the subscriber's account.

IMS supports online charging capabilities through the OCS, where an IMS node or an AS interacts with the OCS in real time to process the user's account and controls the charges related to service usage.

However, it is currently not possible to initiate an announcement from OCS using the Ro interface.

The disclosure is based on communication principles between the OCS and an IMS node as shown in previously-described FIG. 1. To be able to initiate an announcement from OCS, as illustrated schematically in FIG. 11, a new "flexible announcement" service is defined in the AS, trigger points for the service defined in the OCS and additions made to the protocol between the OCS and the AS.

Figure 11:
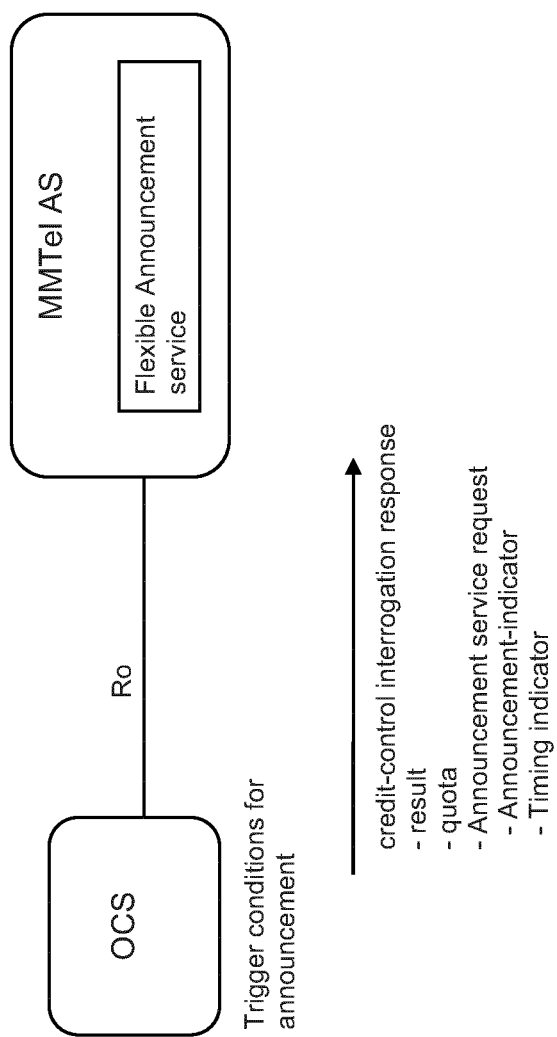
FIG. 11 is for use in explaining a flexible announcement service which can be used in conjunction with or as part of an embodiment of the present invention.

When an ordinary credit-control interrogation request is received at the OCS, either before the call is set up or during the call, the OCS will do the ordinary rating and processes. The result of this request can be successful (i.e. quota is reserved) or it can be unsuccessful. In addition to this, the OCS will also check for the trigger conditions for initiation of an announcement. If the announcement service is to be requested from the AS, the OCS adds this request in the interrogation response to the AS, as illustrated in FIG. 11. The OCS also includes an announcement-indicator to inform the AS which announcement is to be used.

The announcement service in the AS consists of:
Announcement selection part
Connection handling between user and announcement equipment The announcement selection part consists of a mapping function based on the received announcement-indicator from OCS to the internally defined message in the AS.

The AS will set up a connection and control that an announcement is sent to the user. After the message has been delivered to the user, the AS will disconnect the connection to the announcement equipment.

Figure 12B:
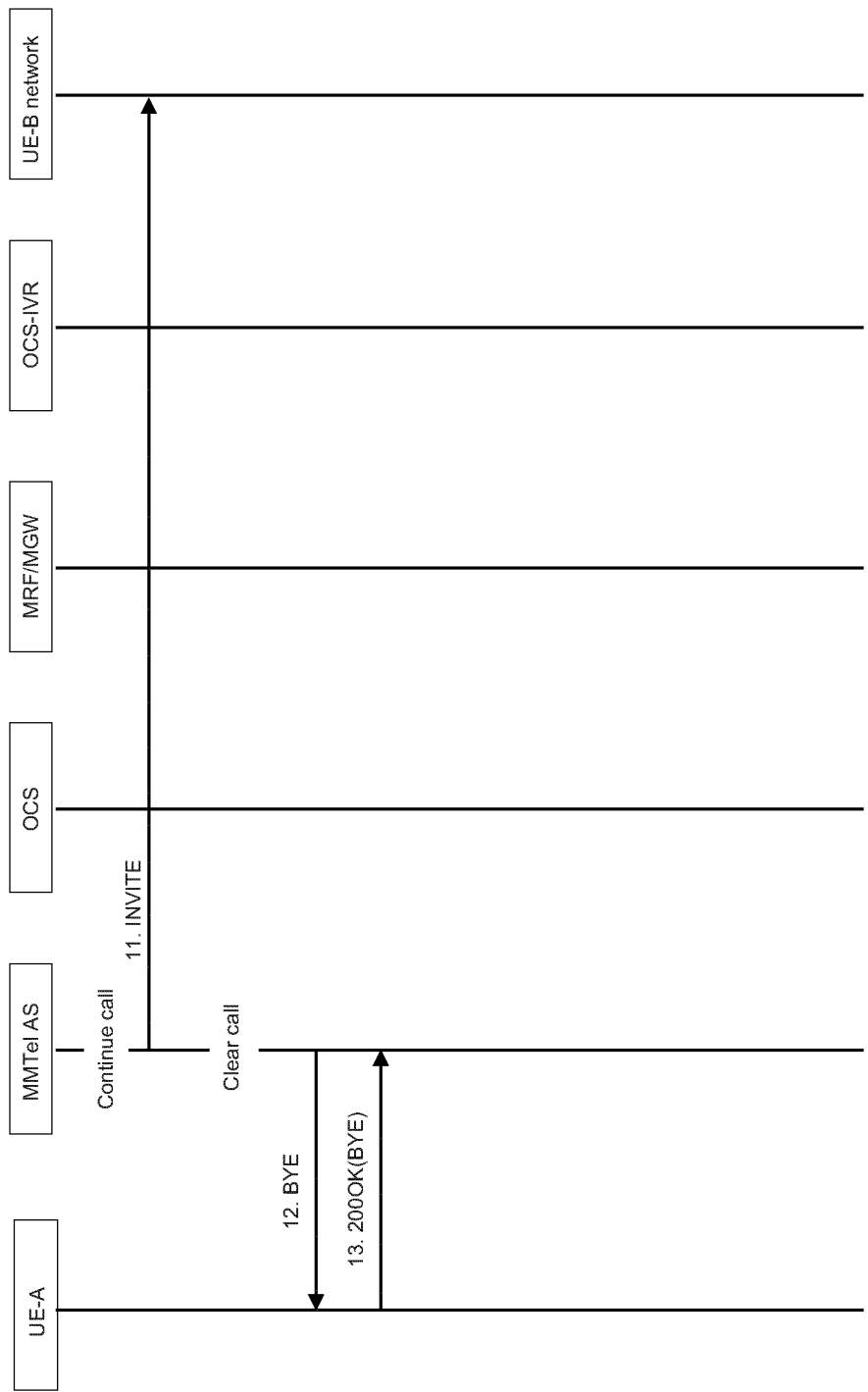

A more detailed example is illustrated in FIGS. 12a and 12b. This example describes an announcement request at call setup.
1. MMTel AS receives an INVITE. The originating subscriber is an online charging user (i.e. an address to OCS is included in PCFA).
2. MMTel AS collects the available charging information and sends a credit control request (CCR(I)) to the OCS.
3. OCS will do a rating based on the received information and check account status. OCS will have the knowledge that the subscriber is a prepaid user. If the Announcement service is possible to request from the AS. OCS will check if some of the trigger conditions for the announcement service is fulfilled.
Trigger conditions in OCS to request the Announcement service in the MMTel AS can for example be:
First call from a new subscriber
First call after a refill
Low balance i.e. a threshold for the account has been passed in OCS.
No credit
Account timer expiry
Service supervision expiry
4. In addition to the normal interrogation result included in credit control answer (CCA(I)), OCS will also add an Announcement request including an announcement-indicator.
The Announcement request is carried in a new grouped AVP.
5. If an Announcement service is available and active in the MMTel AS, the result of the interrogation is stored and the Announcement service is started.
6. The MMTel AS will select an announcement to send to the originating user. The selection is based on the announcement-indicator received from OCS.
7. A connection is established towards the originating user.
8. MMTel AS will establish a connection to a media resource function server (MRF)/media gateway (MGW) and inform which announcement to play.
9. An announcement is played to the originating user. The MRF/MGW indicates to the MMTel AS when the announcement has been delivered.
10. MMtel AS will continue the session based on the result from the interrogation i.e. either continue the call or clear the call.

Figure 13:
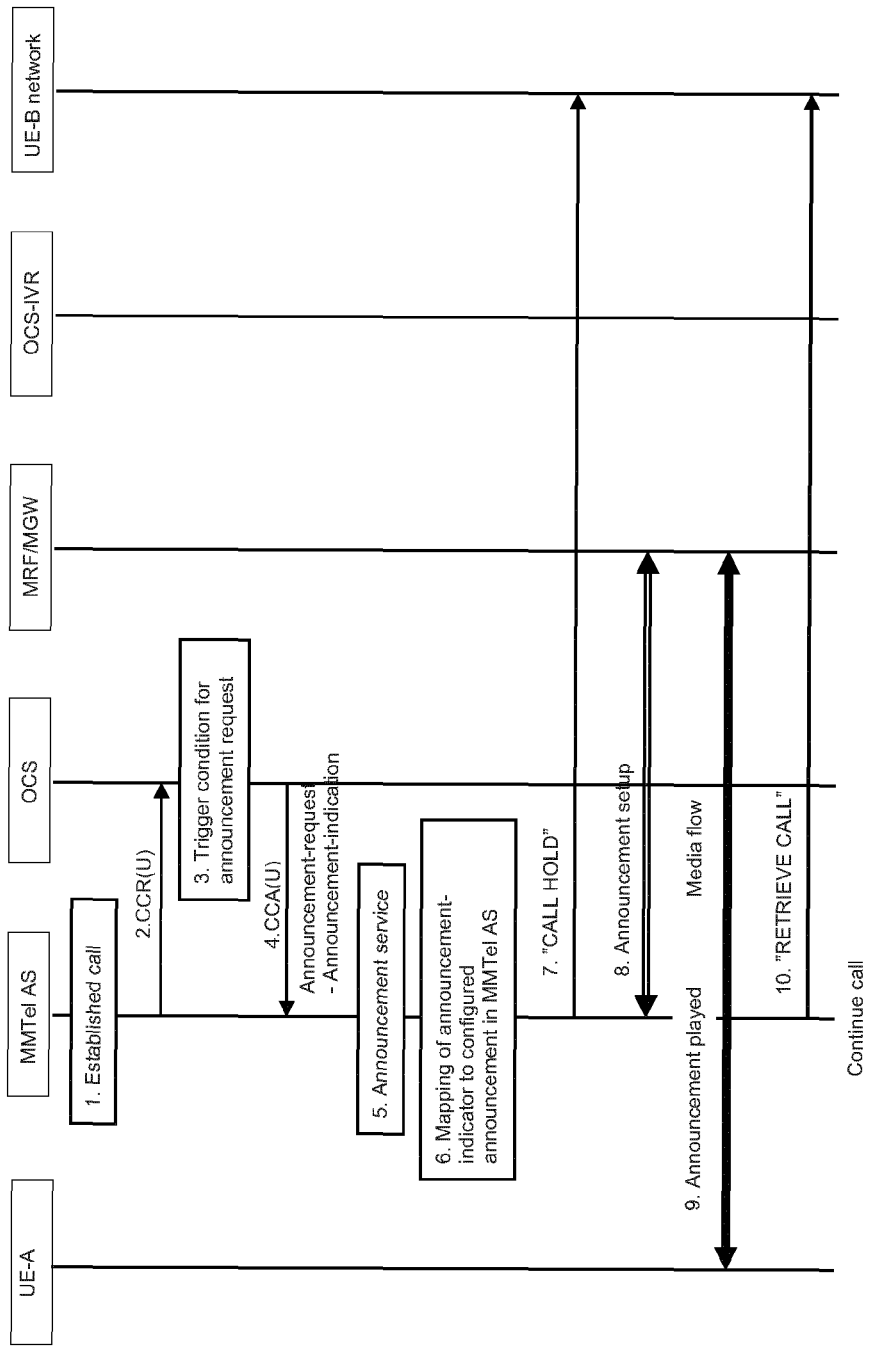

A further detailed example is illustrated in FIG. 13. It describes an announcement request during an established call.
1 A call is established in the MMTel AS.
2 The MMTel AS must do a new interrogation towards the OCS. The reason can be that the earlier received quota has been used or that a rating condition has been changed e.g. a change of media. MMTel AS collects the available charging information and sends an CCR(U) to the OCS.
3 OCS will do a rating based on the received information and check account status. OCS will have the knowledge that the subscriber is a prepaid user. If the Announcement service is possible to request from the AS, OCS will check if some of the trigger conditions for the announcement service is fulfilled.
4 In addition to the normal interrogation result included in CCA(U), OCS will also add an Announcement request including an announcement-indicator.
The Announcement request is carried in a new grouped AVP.
5 If an Announcement service is available and active in the MMTel AS, the result of the interrogation is stored and the Announcement service is started.
6 The MMTel AS will select an announcement to send to the user. The selection is based on the announcement-indicator received from OCS.
7 MMTel AS will place the connected party on hold.
8 MMTel AS will establish a connection to a MRF/MGW and inform which announcement to play.
9 An announcement is played to the user. The MRF/MGW indicates to the MMTel AS when the announcement has been delivered.
10 The connected party will be retrieved.
11 The call continues.

Figure 14:
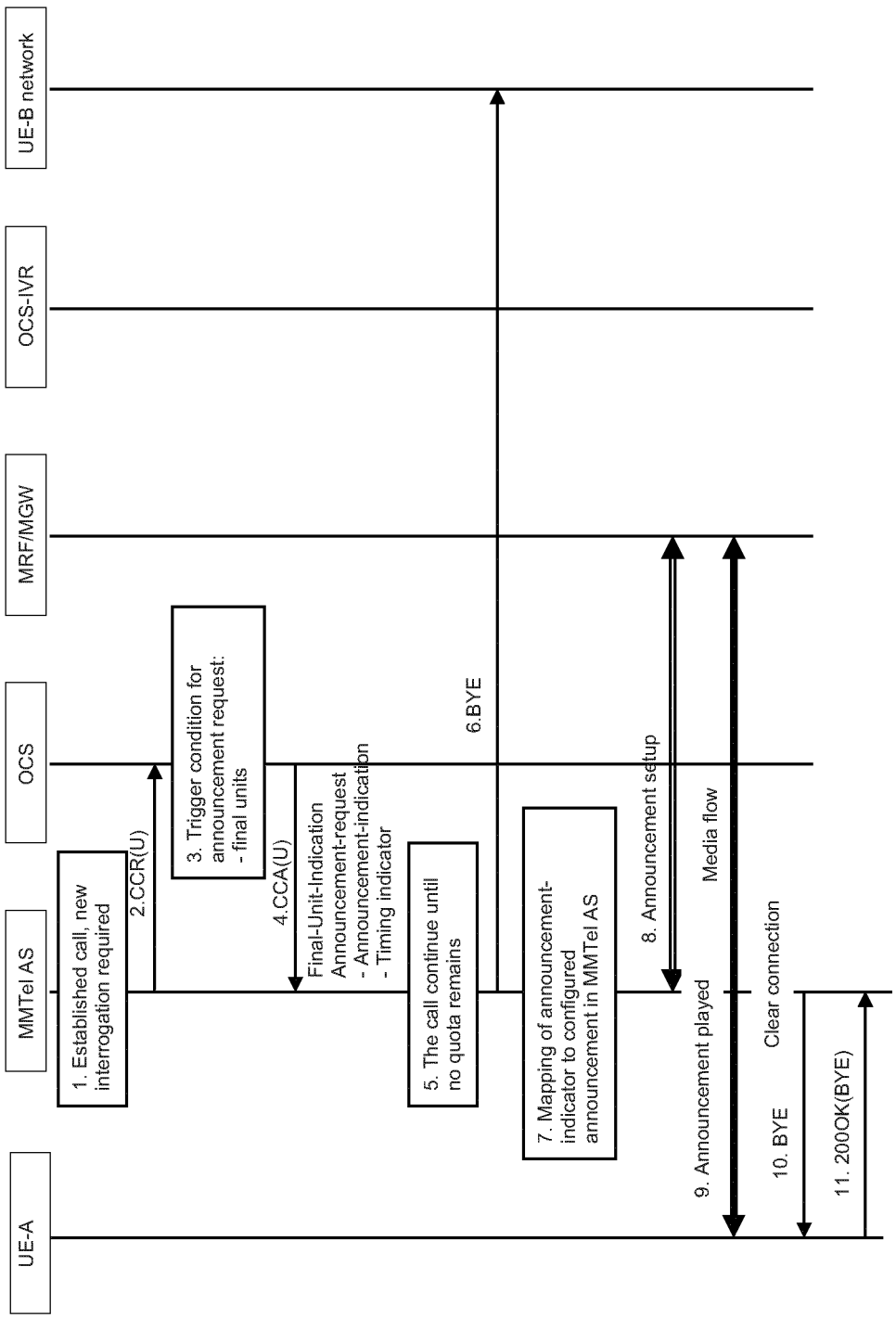

A further detailed example is illustrated in FIG. 14. It shows an announcement request at the end of the call.
1 A call is established in the MMTel AS.
2 The MMTel AS must do a new interrogation towards the OCS. The reason can be that the earlier received quota has been used or that a rating condition has been changed e.g. a change of media. MMTel AS collects the available charging information and sends an CCR(U) to the OCS.
3 OCS will do a rating based on the received information and check account status. OCS will have the knowledge that the subscriber is a prepaid user. If the Announcement service is possible to request from the AS, OCS will check if some of the trigger conditions for the announcement service is fulfilled. In this case the final units from the account will be used.
4 In addition to the normal interrogation result included in CCA(U). OCS will also add an Announcement request including an announcement-indicator and a timing indicator. The Announcement request is carried in a new grouped AVP.
5 If an Announcement service is available and active in the MMTel AS, the result of the interrogation is stored and the Announcement service is started. For this case the timing indicator is used to inform that the message shall be played first after the received quota has been used. The default for the timing indicator is otherwise "immediate".

6 When all quota has been used the MMTel AS disconnects the connected party by sending a BYE.
7 The MMTel AS will select an announcement to send to the user. The selection is based on the announcement-indicator received from OCS.
8 MMTel AS will establish a connection to a MRF/MGW and inform which announcement to play.
9 An announcement is played to the user. The MRF/MGW indicates to the MMTel AS when the announcement has been delivered.
10 The call is cleared.

Figure 15:
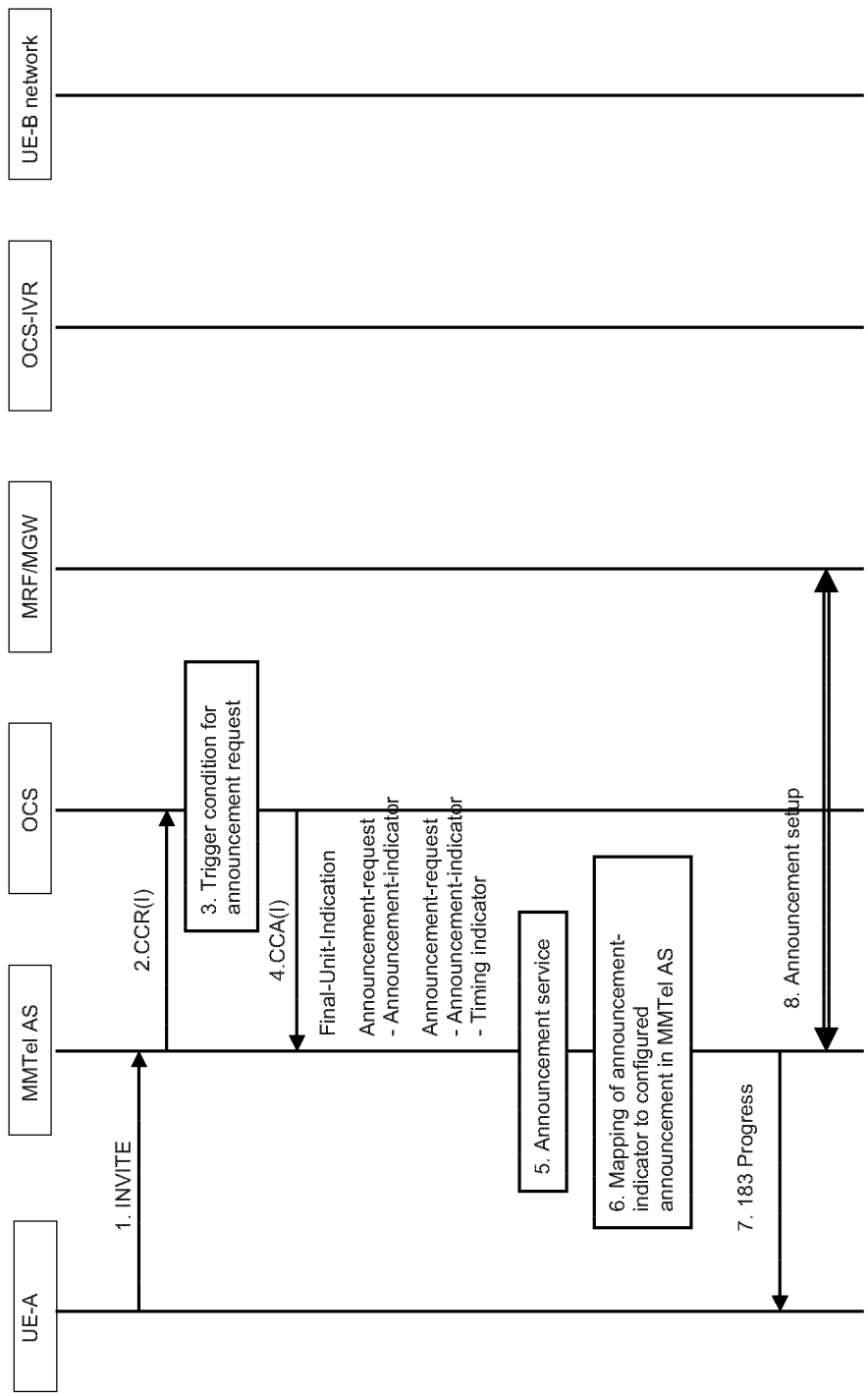

An example of multiple announcements is illustrated in FIG. 15. It describes the case when the account is very low i.e. in the first interrogation towards the OCS the final units on the account will be used. In this case the CCA(I) will include two announcement-requests: one for a call setup announcement and one for the announcement at the end of the call.

Figure 16:
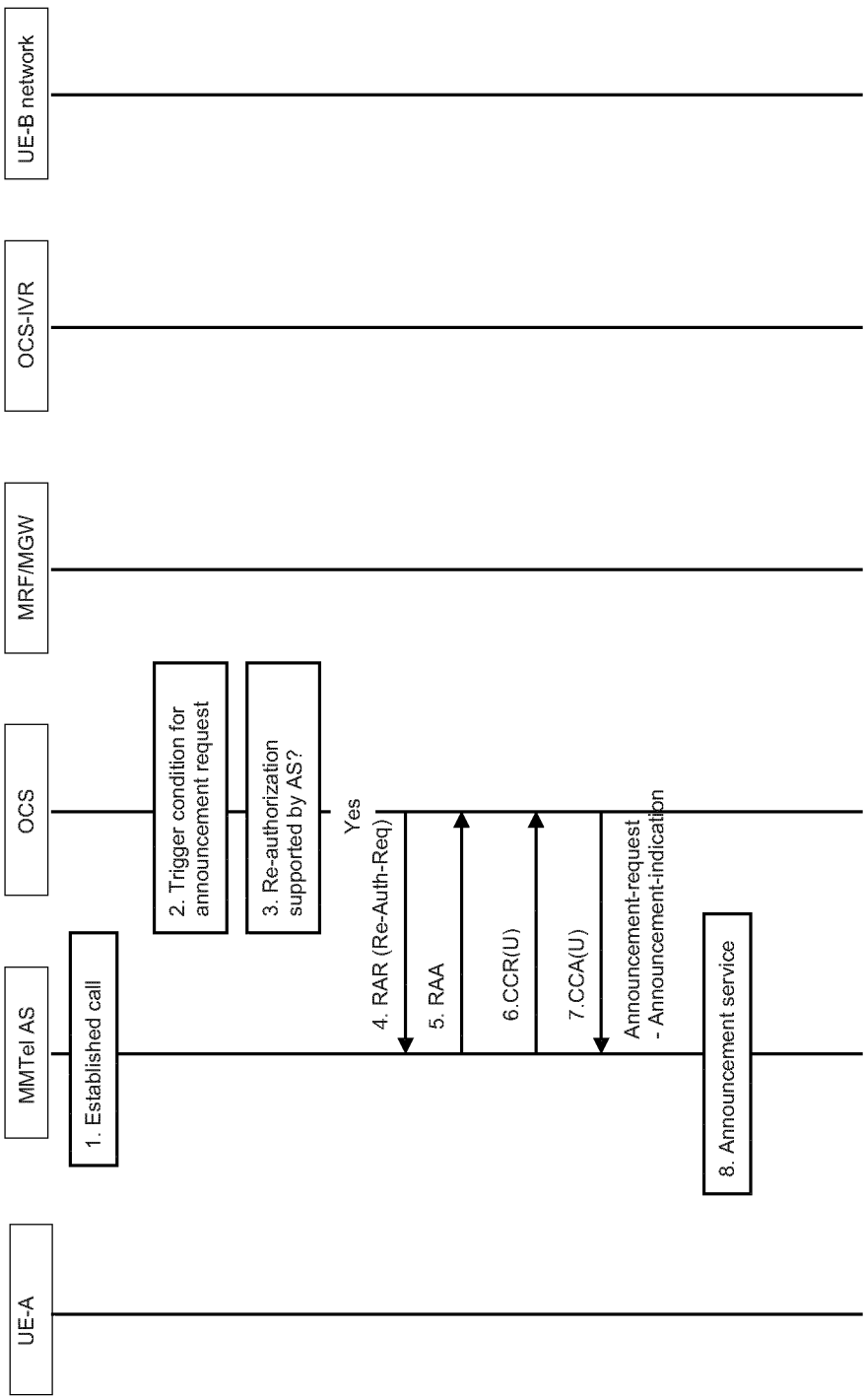

As illustrated in FIG. 16, if a trigger for an urgent announcement in the OCS indicates that an announcement should be played immediately, the OCS can send a Re-Auth-Request (RAR) towards the MMTel AS and force the MMTel AS to do a new interrogation. At processing of this interrogation, the OCS can add the Announcement-request to the interrogation result.

To further enhance the possibility to play more specified announcement with variable parts in it, the announcement handling can be modified. In this case the OCS can create the structure of the announcement by selecting the fixed parts and combine it with the variable parts. An example can be "You have '2' dollars and '25' cents on your account".

Instead of doing mapping in the MMTel AS for the announcement, the defined structure of the announcement by OCS is transferred to the announcement equipment when the MMTel AS establish the connection to the MRF/MGW. The configuration for announcements requested from OCS must then be coordinated between the OCS and the announcement equipment.

For this alternative the Announcement-Indicator used in first proposal is replaced with a new AVP carrying identification of the fixed parts of the announcement and also the variable parts. This information is transferred from MMTel AS to the announcement equipment.

To further enhance the announcement service, it is also possible to include an address to an announcement server in the Announcement request from OCS.

The flexible announcement proposal described herein will make it possible to give a user with online charging in IMS with MMTel the same or better announcement service compared with the available services in the mobile networks of today.

Figure 17:
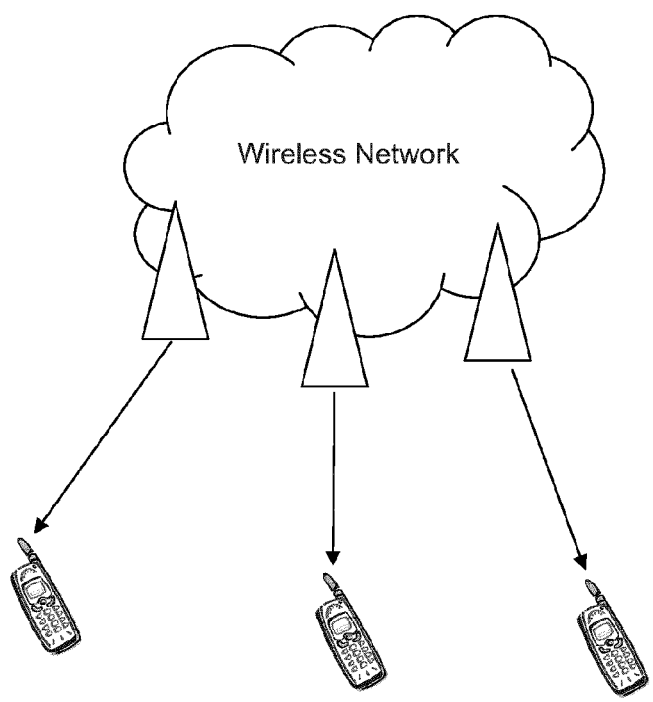
FIG. 17 illustrates schematically a network in which an embodiment of the present invention can be implemented.

Although the described solutions may be implemented in any appropriate type of telecommunication system supporting any suitable communication standards and using any suitable components, particular embodiments of the described solutions may be implemented in an LTE network, such as that illustrated in FIG. 17.

As shown in FIG. 17, the example network may include one or more instances of user equipment (UEs) and one or more base stations capable of communicating with these UEs, along with any additional elements suitable to support communication between UEs or between a UE and another communication device (such as a landline telephone). Although the illustrated UEs may represent communication devices that include any suitable combination of hardware and/or software, these UEs may, in particular embodiments, represent devices such as the example UE illustrated in greater detail by FIG. 18. Similarly, although the illustrated base stations may represent network nodes that include any suitable combination of hardware and/or software, these base stations may, in particular embodiments, represent devices such as the example base station illustrated in greater detail by FIG. 19.

Figure 18:
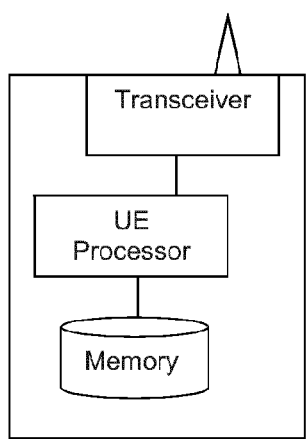
FIG. 18 illustrates schematically a user terminal according to an embodiment of the present invention.

As shown in FIG. 18, the example UE includes a processor, a memory, a transceiver, and an antenna. In particular embodiments, some or all of the functionality described above as being provided by mobile communication devices or other forms of UE may be provided by the UE processor executing instructions stored on a computer-readable medium, such as the memory shown in FIG. 18. Alternative embodiments of the UE may include additional components beyond those shown in FIG. 18 that may be responsible for providing certain aspects of the UE's functionality, including any of the functionality described above and/or any functionality necessary to support the solution described above.

Figure 19:
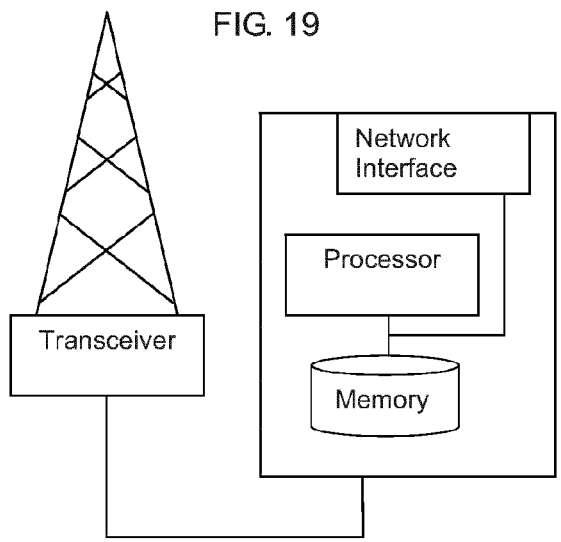
FIG. 19 illustrates schematically a base station according to an embodiment of the present invention.

As shown in FIG. 19, the example base station includes a processor, a memory, a transceiver, and an antenna. In particular embodiments, some or all of the functionality described above as being provided by a mobile base station, a base station controller, a node B, an enhanced node B, and/or any other type of mobile communications node may be provided by the base station processor executing instructions stored on a computer-readable medium, such as the memory shown in FIG. 19. Alternative embodiments of the base station may include additional components responsible for providing additional functionality, including any of the functionality identified above and/or any functionality necessary to support the solution described above.

The technique proposed herein will make it possible to give a prepaid user in IMS with MMTel the same or better replenishment service compared with the available services in the mobile networks of today.

The appended signaling diagrams can be considered not only to depict a series of messages exchanged and method steps performed by the various nodes, but also to depict apparatus for exchanging those messages or performing those method steps. In addition, for the sake of completeness, any message which is shown or described as being sent from node A to node B implicitly includes the step of node A sending the message as well as the step of node B receiving the message, and means at nodes A and B for performing those steps.

It will be appreciated by the person of skill in the art that various modifications may be made to the above described embodiments without departing from the scope of the present disclosure. For example, it will be readily appreciated that although the above embodiments are described with reference to parts of a 3GPP core network, the technique described herein will also be applicable to like networks, such as a successor of the 3GPP core network, having like functional components. The term User Equipment (UE) is also used in place of the term mobile terminal or mobile phone. The term UE is familiar in the 3rd Generation Partnership Project (3GPP) documentation, and is intended to refer to any piece of equipment that is configured to access the internet; it would include, for example and without limitation, mobile telecommunication devices, portable or handheld computing devices and desktop or installed computers. Therefore, terms such as 3GPP and UE and associated or related terms used in the above description and in the appended drawings are to be interpreted accordingly.

The invention claimed is:

1. A method for online charging within an IP Multimedia Subsystem (IMS), the method comprising, at an IMS charging node:

receiving a first credit control request message from an IMS service network node over a service charging interface provided between the IMS service network node and the IMS charging node;

in response to receipt of the first credit control message, determining with reference to one or more triggering conditions that a replenishment of credit is to be offered for a user associated with the first credit control request message; and following such a determination:
- (i) initiating a credit replenishment service in the IMS service network node by sending a replenishment request in a first credit control answer message over the service charging interface to the IMS service network node, the first credit control answer message being in response to the first credit control request message; or
- (ii) initiating a credit replenishment service in the IMS charging node, receiving a second credit control request message associated with the user from a transport network node over a bearer charging interface provided between the transport network node and the IMS charging node, and, in response to receipt of the second credit control request message and as part of the replenishment service, sending a replenishment request in a second credit control answer message over the bearer charging interface to the transport network node, the second credit control answer message being in response to the second credit control request message.

2. The method of claim 1, wherein initiating the credit replenishment service comprises arranging for an announcement to be provided to the user relating to the replenishment service.

3. The method of claim 2, comprising, where the replenishment service is initiated at the IMS charging node, including information relating to the announcement in a credit control answer message sent to the IMS service network node over the service charging interface in reply to the first credit control request message.

4. The method of claim 1, wherein initiating the replenishment service comprises arranging for the user to be offered a choice between replenishing credit and continuing the service without replenishment.

5. The method of claim 1, wherein initiating the replenishment service comprises arranging for the user to be directed to a replenishment server to enable the user to replenish credit.

6. The method of claim 5, comprising providing information relating to the replenishment server in the first or second credit control answer message.

7. The method of claim 6, wherein the information comprises at least one of an address of a replenishment server, and a reason for replenishment.

8. The method of claim 1, wherein the credit control answer message is a Diameter Credit Control Answer (CCA) message.

9. The method of claim 1, wherein the credit control request message is a Diameter Credit Control Request (CCR) message.

10. The method of claim 1, wherein the IMS charging node comprises an Online Charging System (OCS).

11. The method of claim 1, wherein the IMS service network node comprises an Application Server.

12. The method of claim 1, wherein the service charging interface is a Diameter Ro interface.

13. The method of claim 1, wherein the bearer charging interface is a Diameter Gy interface.

14. A method for online charging within an IP Multimedia Subsystem (IMS), the method comprising, at an IMS service network node:

sending a credit control request message to an IMS charging node over a service charging interface provided between the IMS service network node and the IMS charging node;

following a determination at the IMS charging node that a replenishment of credit is to be offered for a user associated with the credit control request message, receiving a replenishment request in a credit control answer message over the service charging interface, the credit control answer message being in response to the credit control request message;

in response to receipt of the replenishment request, activating a credit replenishment service in the IMS service network node; and as part of the replenishment service, arranging for replenishment of credit based on information in the replenishment request.

15. The method of claim 14, comprising sending a message to the user's device to request that a replenishment application on the device is used to perform at least part of the replenishment service.

16. The method of claim 14, wherein the credit control answer message is a Diameter Credit Control Answer (CCA) message.

17. The method of claim 14, wherein the credit control request message is a Diameter Credit Control Request (CCR) message.

18. The method of claim 14, wherein the IMS charging node comprises an Online Charging System (OCS).

19. An apparatus for online charging within an IP Multimedia Subsystem (IMS), the apparatus comprising an input/output interface circuit, and a processing circuit adapted to:

receive a first credit control request message from an IMS service network node, via the input/output interface circuit, over a service charging interface provided between the IMS service network node and the IMS charging node;

in response to receipt of the first credit control message, determine with reference to one or more triggering conditions that a replenishment of credit is to be offered for a user associated with the first credit control request message; and following such a determination:
- (i) initiate a credit replenishment service in the IMS service network node by sending a replenishment request in a first credit control answer message over the service charging interface to the IMS service network node, the first credit control answer message being in response to the first credit control request message; or
- (ii) initiate a credit replenishment service in the IMS charging node, receive a second credit control request message associated with the user from a transport network node over a bearer charging interface provided between the transport network node and the IMS charging node, and, in response to receipt of the second credit control request message and as part of the replenishment service, send a replenishment request in a second credit control answer message over the bearer charging interface to the transport network node, the second credit control answer message being in response to the second credit control request message.

20. An apparatus for online charging within an IP Multimedia Subsystem (IMS), the apparatus comprising an input/output interface circuit, and a processing circuit adapted to:
- send a credit control request message to an IMS charging node via the input/output interface circuit, over a service charging interface provided between the IMS service network node and the IMS charging node;
- following a determination at the IMS charging node that a replenishment of credit is to be offered for a user associated with the credit control request message, receive a replenishment request in a credit control answer message over the service charging interface, the credit control answer message being in response to the credit control request message;
- in response to receipt of the replenishment request, activate a credit replenishment service in the IMS service network node; and
- as part of the replenishment service, arrange for replenishment of credit based on information in the replenishment request.

* * * * *